United States Patent
Jones et al.

(10) Patent No.: US 6,621,621 B1
(45) Date of Patent: Sep. 16, 2003

(54) LINE AMPLIFICATION SYSTEM FOR WAVELENGTH SWITCHED OPTICAL NETWORKS

(75) Inventors: Kevan Peter Jones, Kanata (CA); Mark Stephen Wight, Ottawa (CA); Alan Glen Solheim, Stittsville (CA); Paul Edward Beer, Nepean (CA)

(73) Assignee: Innovance, Inc., Piscataway, NJ (US)

(*) Notice: Subject to any disclaimer, the term of this patent is extended or adjusted under 35 U.S.C. 154(b) by 0 days.

(21) Appl. No.: 09/975,362

(22) Filed: Oct. 11, 2001

Related U.S. Application Data

(63) Continuation-in-part of application No. 09/876,391, filed on Jun. 7, 2001, and a continuation-in-part of application No. 09/930,528, filed on Aug. 15, 2001.
(60) Provisional application No. 60/306,302, filed on Jul. 18, 2001.

(51) Int. Cl.[7] .......................... H04B 10/12; H04J 14/02; H01S 3/30
(52) U.S. Cl. .............. 359/337.11; 359/334; 359/337.1; 359/341.41; 372/3
(58) Field of Search .......................... 359/334, 337.1, 359/337.11, 341.41; 372/3

(56) References Cited

U.S. PATENT DOCUMENTS

| | | | |
|---|---|---|---|
| 6,115,174 A | 9/2000 | Grubb et al. | |
| 6,236,487 B1 | 5/2001 | Stephens | |
| 6,282,002 B1 | 8/2001 | Grubb et al. | |
| 6,377,396 B1 | 4/2002 | Sun et al. | 359/341.42 |
| 6,388,801 B1 | 5/2002 | Sugaya et al. | 359/334 |
| 6,429,966 B1 | 8/2002 | Hazell et al. | 359/341.41 |
| 6,441,950 B1 * | 8/2002 | Chen et al. | 359/334 |
| 6,466,362 B1 * | 10/2002 | Friedrich | 359/334 |
| 6,515,777 B1 * | 2/2003 | Arnold et al. | 359/128 |

* cited by examiner

Primary Examiner—Nelson Moskowitz
(74) Attorney, Agent, or Firm—Hayes Soloway P.C.

(57) ABSTRACT

A line amplification system connected on the fiber between two flexibility sites of a wavelength switched network is built with a number of modules that can be arranged in a line amplifier, preamplifier and postamplifier configurations. The line and preamplifiers include a Raman module and a two-stage EDFA module provided with mid-stage access. A dynamic gain equalizer is connected in the mid-stage in the line amplification configurations. As well, dispersion compensating module may be connected in the mid-stage whenever/if needed. A line monitoring and control system operates the line amplification system so that all channels traveling along a link have substantially the same power, in the context of channels being added and removed to/from the line arbitrarily.

9 Claims, 15 Drawing Sheets

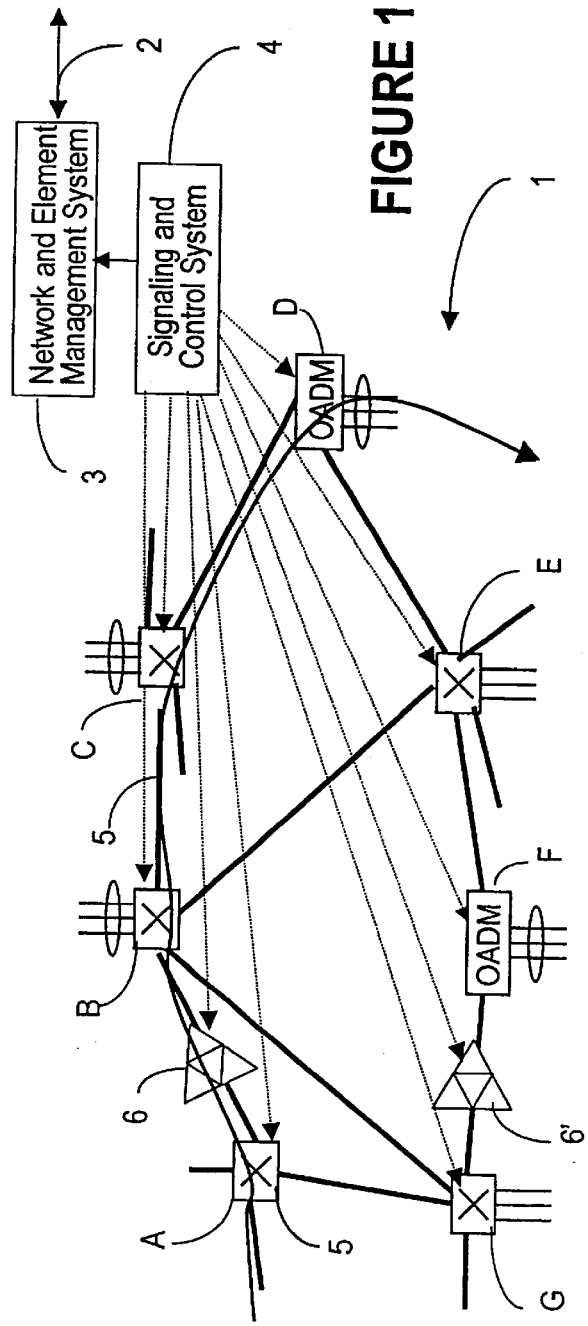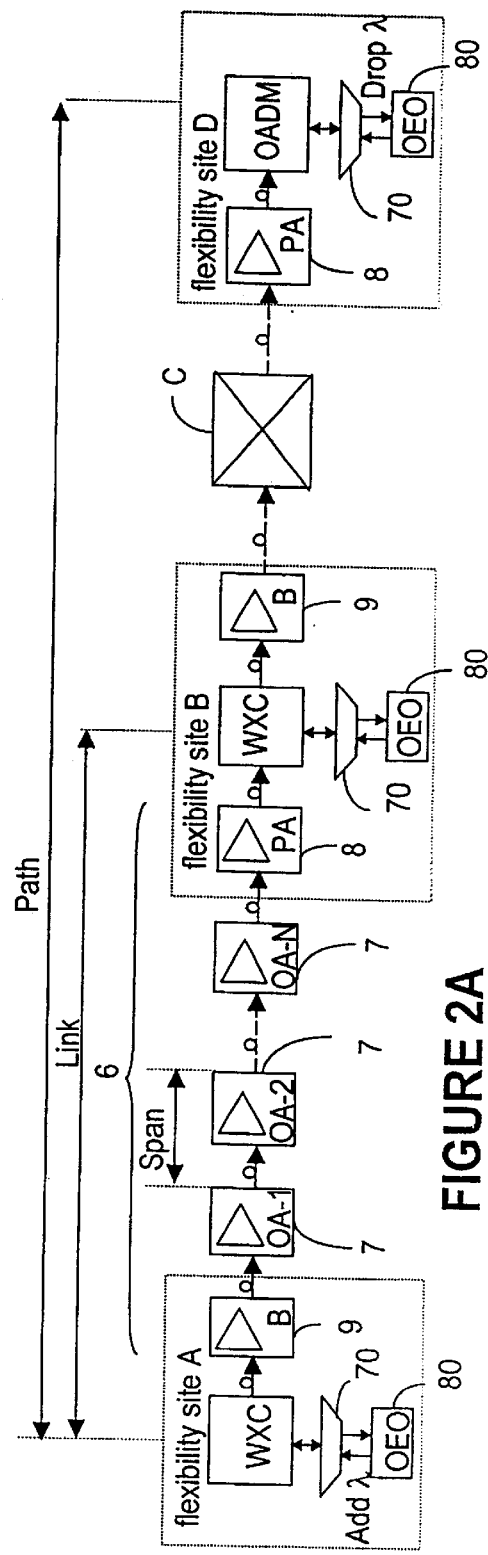
FIGURE 1
FIGURE 2A

LINE AMPLIFICATION SYSTEM FOR WAVELENGTH SWITCHED OPTICAL NETWORKS

PRIORITY - RELATED PATENT APPLICATION

This application is a continuation-in-part of "Architecture for a Photonic Transport Network" (Roorda et al.), Ser. No. 09/876,391, filed on Jun. 7, 2001; and "Method for Engineering connections in a dynamically Reconfigurable Photonic Switched Network" (Zhou et al.), provisional patent application filed Jul. 18, 2001, Ser. No. 60/306,302; formal patent application filed Aug. 15, 2001, Ser. No. 09/930,528.

"Architecture for an Optical Network Manager" (Emery et al.) Ser. No. 60/298,008, provisional patent application filed on Jun. 13, 2001.

FIELD OF THE INVENTION

The invention is directed to optical telecommunications networks, and in particular, to a line amplification system for wavelength switched optical networks.

BACKGROUND OF THE INVENTION

The equipment of an optical network can be generally classified into two categories, namely the switching nodes and the line system. The switching nodes are concerned with switching the channels in the input WDM (wavelength division multiplexing) signal to an output of choice, and with add/dropping the on-ramp/off-ramp user signals into/from the WDM signal. The line system includes the optical components and the fiber between two successive switching nodes, and is concerned with conditioning (line amplification, power control, dispersion control, etc.) the WDM signals to achieve long-haul transmission. Generally, the switching nodes may also include a preamplifier and a postamplifier, which are part of the line system.

Optical network architecture

Current optical networks are based on a WDM physical layer, using point-to-point (pt-pt) connectivity. While ultra-long reach achieved lately provides lower cost networks by substantially reducing the number of line regenerators, regeneration is nonetheless performed for all channels at the switching nodes, as often called 'hidden regeneration'. This is because point-to-point connectivity implies OEO (optical-to-electrical-to-optical) processing of all channels arriving at a switching node. While optical-to-electrical O/E and E/O conversions are necessary for the off-ramp and on-ramp signals, they are not always necessary for the signals that pass through a switching node. The passthrough traffic, which is unnecessarily OEO processed, accounts for a large percentage (over 50%) of the total traffic at a node. As the number of channels in the WDM signal grows, the cost of the 'hidden regenerators' also grows, hindering the profit for the network provider.

The present invention is applicable to a wavelength switched network where each signal travels between a different source and destination node, without unnecessary OEO conversions at all intermediate nodes. The present specification is concerned with the line amplification system of such a network, that is generally described in the co-pending patent applications "Architecture for a Photonic transport Network" (Roorda et al.), Ser. No. 09/876,391, filed on Jun. 8, 2001. The present invention is also concerned with a line control system generally described in the patent application "Method for Engineering connections in a dynamically Reconfigurable Photonic Switched Network" (Zhou et al.), provisional patent application filed Jul. 18, 2001, Ser. No. 60/306,302, formal patent application filed August 2001, Ser. No. 09/930,528. This patent application claims priority from both above-mentioned patent applications. Details about the software architecture and operation of this photonic network are also described, illustrated and claimed in the co-pending provisional patent application "Architecture for an Optical Network Manager" (Emery et al.), Ser. No. 60/298,008, filed on Jun. 13, 2001, which is incorporated herein by reference.

To summarize, the conventional architecture is replaced by a new architecture where repetitive regeneration of all channels in a WDM signal is not necessary, regeneration being performed only for individual channels based on the current network performance. Thus, the challenges in designing a line amplification system for such a network are substantially different from those encountered in conventional transport networks. For example, the number of the channels in a WDM signal on any link of such a network, as well as the bandwidth of the WDM signal, change as channels are arbitrarily added and removed across the network. As well, traditional channel performance optimization methods cannot be applied to end-to-end connections that pass through many nodes without OEO conversion.

Thus, there is a need to provide a line amplification system adaptable to condition a WDM signal with a variable number of channels, variable wavelength-to-channel allocation, and random channel add/drop.

There is also a need to provide a line amplification system that allows for use of OEO regeneration only at the nodes, and only for specific channels that need regeneration, based on the current network connectivity and performance.

There is also a need to provide a line amplification system with a line control system adapted to collect current information on current physical performance parameters of the span and link, to allow for individual channel optimization in the context of dynamic configuration and reconfiguration of the network.

Long reach and ultra-long reach optical transmission

Expansion of long haul optical communication networks has been fueled by the data traffic, and is estimated to be in the order of 70–150%. Particularly, since the popularity of the World Wide Web has enabled business transactions over the Internet, IP (Internet Protocol) and IP-based services have grown and evolved dramatically.

The reach, or the distance traveled by an optical channel along a path between a source node and a destination node, is limited by the combined effect of attenuation and distortion experienced by the signal along the path.

A solution to control attenuation is to place electro-optic repeaters (regenerators) at distances of 40–80 km, for retiming, regenerating and reformatting the optical signal. This solution however implies conversion of the optical signal to an electrical format and re-conversion of the processed electrical signal into an optical format (OEO conversion). With the advent of WDM, the cost of regenerators became prohibitive; this lead to development of optical amplifiers, which amplify an entire transmission band, i.e. a plurality of channels passing through it, without OEO conversion.

There are three types of optical amplifiers: post-amplifiers that connect to a transmitter to boost the output power, line amplifiers that amplify the optical signals along the signal route, and preamplifiers that improve the sensitivity of optical receivers. These different types of amplifiers provide different output power levels, use different input power levels, and generally have different noise figure requirements. The typical distance between two optical amplifiers is 80–100 km.

Although the EDFAs can support very long fiber spans by significantly increasing the optical power of all optical channels passing through them, they exhibit a wavelength-dependent gain profile, noise profile, and saturation characteristics. Hence, each optical channel experiences a different gain along a transmission path. The gain tilt is controlled typically, by selecting the channels of the WDM signal to have a similar gain tilt; however, this is not always possible, especially for networks with a high density of channels. Another solution used lately is to provide the optical amplifiers with dynamic gain flattening means such dynamic gain equalizers (DGE), which flatten-out specific wavelengths and can be tuned as needed.

For transmission speeds over 2.5 Gb/s, signal corruption caused by Chromatic Dispersion (CD) also becomes very important. Chromatic dispersion is the dependence of the speed of light on its frequency (wavelength), measured in ps/nm, and is attributable to optical fiber and optical components in general. CD compensation is realized by installing devices with a net CD in the opposite sense. For example, if a network provider wishes to compensate for 1700 ps/nm of CD for a particular wavelength or a set of wavelengths, it can use a dispersion compensating module (DCM) that has a negative value of −1700 ps/nm of CD in the same wavelength regime. After the compensator, the CD is essentially zero. Sometimes the network provider will compensate the net dispersion to a non-zero value.

Another way to increase the signal reach is to use the Stimulated Raman Scattering effect. Thus, by pumping the fiber using a laser of a certain power(s) and wavelength(s), the signal is further amplified by this effect. Typically, the Raman pump injects light in a direction opposite to the traffic flow; pumping in the forward direction is also possible. The spectral intensity profile of the Raman gain is dependent on the power and wavelength of the reverse-pumped light and also on the number of the wavelengths (pumps) used. The broader the spectrum of the pumped light, the wider the spectral intensity profile of the gain (i.e. the number of traffic channels amplified) is. However, the complexity of control increases with the number of the pumped wavelength; also these wavelengths need to be selected so as to not interfere with the traffic and the supervisory (service) channels. As Raman scattering phenomena produces gain at wavelengths higher than the pump wavelength, the wavelengths of the Raman pumps depend on the transmission band used for traffic.

As a result of the above methods of increasing the transmission reach, distances of over 3,000 km were obtained lately experimentally, and research for increasing this distance continues.

Nonetheless, in traditional networks, channel allocation is fixed and therefore any reach-capacity enhancement needs to be performed at regular intervals and on a span-by-span basis. This results in a very large service activation time. Furthermore, performance of the line amplification system is enhanced using span equalization, meaning that the power of channels co-propagating along the same fiber span is adjusted based on the power of the worst performing channel. This is clearly not an efficient way of utilizing the network resources.

There is a need for a line amplification system that allows channels originating at arbitrary nodes in the network to travel over a long distance to an arbitrary destination node. Such a line amplification system will need to condition the channels based on current physical performance parameters along a span and a link, to allow for individual channel optimization in the context of dynamic configuration and reconfiguration of the network.

A typical optical network is characterized by different losses in each section, depending upon the fiber type, fiber length, cabling and slicing losses. Also, different network operators have distinctive losses and loss distribution in their networks. Currently, enhancement of each span performance is addressed differently, resulting in a plurality of hardware variants, with the ensuing complexity in inventory management and additional costs.

There is a need to provide a line amplification system that is modular, scalable and flexible in performance, for minimizing the number of hardware variants, the costs associated with the complexity of inventory management and installation and operation costs.

The current networks are able to maintain inventory data at the network element level, using complex software running on a network management system, if available. They are not able to report the specific configuration at the unit, card-pack and shelf, bay and network element level. For large networks, there is currently a huge challenge to maintain an updated view of the network inventory; this results in lengthy processes for upgrades, maintenance and repairs.

There is a need to provide a line amplification system adapted to maintain current network topology and connectivity information to allow for real-time span and link optimization as the network grows.

SUMMARY OF THE INVENTION

It is an object of the invention to provide a line amplification system for an ultra-long haul photonic network capable of automatic optical routing and switching of traffic. It is another object of the invention is to provide a line amplification system that is modular, scalable and flexible in performance.

Still another object of the invention to provide a flexible line control system where each wavelength is engineered individually for allowing application-specific capacity-reach trade-off, with no changes to the hardware configuration of the line amplification system.

The invention provides an optical amplifier for a wavelength switched optical network comprising a Raman unit for amplifying a WDM optical signal with a Raman gain; an EDFA unit connected to the Raman unit for further amplifying the WDM signal with a EDFA gain; and a shelf-level control network for monitoring and controlling operation of the optical amplifier to maintain a substantially similar power for all channels of the WDM signal.

According to another aspect of the invention, a line amplification system for a wavelength switched optical network comprises at a first flexibility site, a post-amplifier unit for amplifying a WDM optical signal and launching same over a fiber link; at a second flexibility site, a pre-amplifier unit for amplifying the WDM optical signal received over the fiber link; one or more line amplifier units connected on the fiber link between the first and second flexibility sites for amplifying the WDM signal; and a line monitoring and control system for collecting a plurality of real-time operational parameters pertinent to the current operation of the units and operating the line amplification system according to a plurality of target operational parameters, wherein the real-time operational parameters change due to end-to-end network churn caused by dynamic set-up and tear-down of user connections.

Still further, the invention relates to a line monitoring and control system for a line amplification system of a wavelength switched optical network comprising: an embedded control layer, comprising an embedded controller provided on each card pack of an optical amplifier for controlling operation of the card pack; a link control layer comprising a plurality of shelf processors for coordinating operation of all optical amplifiers connected on a link of the wavelength switched optical network to achieve an output power profile target for the link; and a network control layer comprising a plurality of optical link controllers for coordinating operation of all optical modules placed on a plurality of consecutive links making-up a connection.

A control loop for an optical amplification span of a wavelength switched optical network is also provided according to the invention. The control loop comprises: means for measuring at preset intervals, a set of performance data regarding a WDM signal traveling along an optical section; a vector gain loop for receiving a set of current performance data and a gain target, and providing a gain adjustment signal comprising a gain adjustment component for each channel of the WDM signal; a control rules block for processing the gain adjustment components according to the set of current performance data, a set of previous performance data and section status data, and providing a control signal; wherein the control signal adjusts the operational parameters of all card-packs of the optical section to provide substantially similar gain for each channel of the WDM signal.

According to a yet further aspect, the invention provides a method of transmitting a WDM signal along a span of a wavelength switched optical network comprising: measuring an input power of the WDM signal at the input of the span; amplifying the WDM optical signal and measuring the spectrum and output power of the WDM signal; and controlling operation of the optical amplifier according to the input and output power and spectrum and also according to a set of rules to compensate for the losses and degradation of the WDM signal along the fiber of the span.

BRIEF DESCRIPTION OF THE DRAWINGS

The foregoing and other objects, features and advantages of the invention will be apparent from the following more particular description of the preferred embodiments, as illustrated in the appended drawings, where:

FIG. 1 is a block diagram of a network to which the present invention applies;

FIG. 2A shows an example of a path of a channel in the network of FIG. 1, showing the line amplification system along the path;

DESCRIPTION OF THE PREFERRED EMBODIMENTS

Figure 2B:
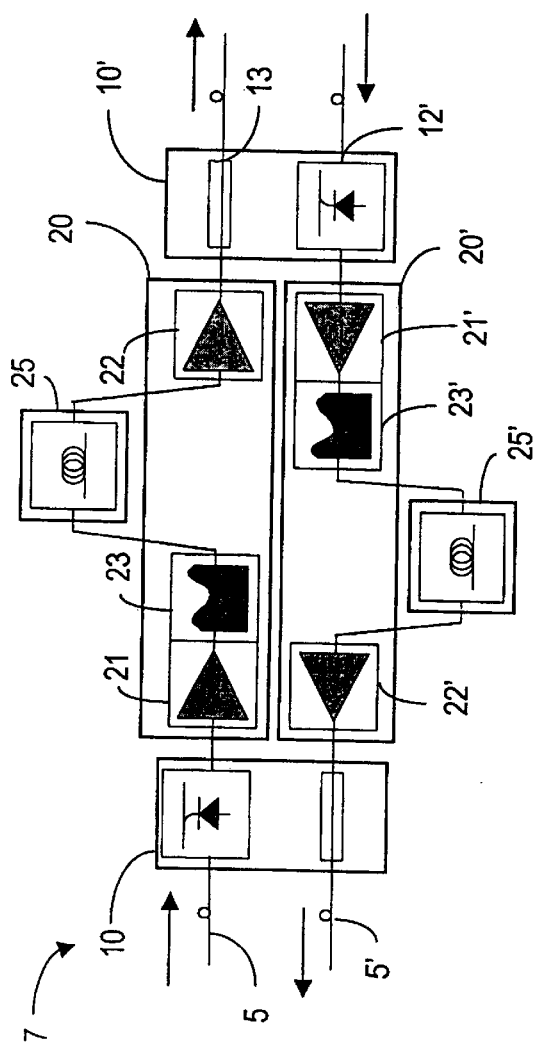
FIG. 2B shows an embodiment of a line amplifier configuration for the network of FIG. 1.

FIG. 1 provides an illustration of a wavelength switched network 1 as an example of an application of the line amplification system according to the invention. Network 1 comprises a plurality of switching nodes (also called flexibility sites), such as nodes A–G, connected by fiber links 5.

A flexibility site may comprise a wavelength cross-connect WXC as shown at nodes A, B, C, E and G, which switches the traffic from an input line to a user connected to the respective node ('drop', or 'off-ramp' traffic), and the traffic originating at the node from the respective user to an output line ('add' or 'on-ramp' traffic). Also, WXC switches the traffic passing through the node ('passthrough' or 'passthru' traffic) from any input line to any output line in optical format. Network 1 may also comprise optical add/drop multiplexer OADM nodes as shown at D and F, which are preferably provided at smaller sites that accommodate e.g. only two lines for bidirectional traffic.

A signalling and control system SCS 4 is provided between all nodes and the line amplification system. SCS 4 allows topology discovery, fault monitoring, and photonic layer management. As new resources are added to the network, system 4 updates a network topology database (29 on FIG. 5A) with the new resources, their location and connectivity, operating parameters, etc. Based on this information and on current photonic layer parameters and targets, a network and element management system 3 monitors and controls operation of the network nodes and their connectivity. Item 2 shows a network operating center from were an operator can visually monitor operation of network 1.

Line amplification system

The line amplification system according to the invention, shown generally at 6, is connected on the fiber links 5 between the flexibility sites for conditioning the signal to achieve long reach, high speed transmission. It is to be noted that reference numeral 6 generically refers to a line post-amplifier 9 at e.g. flexibility site A, a plurality of line amplifiers 7 connected on fiber 5 and a preamplifier 8 at next flexibility site B.

FIG. 2A shows an example of a path for a channel λ originating at flexibility site A and terminating at flexibility site D. Besides a preamplifier 8 and a post-amplifier 9, a flexibility site comprises a switch WXC as shown for site B, or an OADM as shown for site D, an access system 70 and an electro-optics system 80. The access system 70 de/multiplexes the channels dropped/added at the respective node, and the electro-optics 80 performs optical-to-electrical conversion for the dropped channels, and/or the electrical-to-optical conversion for the added channels. The electro-optics system 80 comprises the transponders with the long-reach transmitters and receivers, and a pool of regenerators that may be assigned to any channel passing through the node, and that needs regeneration. For this example, it is assumed that the signal travels in optical format between terminal nodes A and D, without OEO conversion at any of the intermediate flexibility sites B and C.

A traffic channel is defined herein as a carrier wavelength modulated with a data signal. The fiber between two optical amplification sites e.g. OA-1 to OA-2 is called a span (or a section), the fiber and optical components between two flexibility sites e.g. site A and site B is called a link, and the fiber and optical components between a source site and a destination site of a channel, e.g. between site A and site D in the example of FIG. 2A is called an optical path, or trail.

FIG. 2B shows an optical line amplifier 7, which comprises in general, for one direction of traffic, a Raman amplification unit 10 and a mid-stage access EDFA unit 20 for the forward direction (West to East). FIG. 2B also shows a line amplification unit for the reverse direction (East to West), comprising again a Raman amplification unit 10' and a mid-stage access EDFA unit 20'. Use of distributed Raman amplification in conjunction with EDFA allows OSNR performance optimization for the respective preceding span.

Units 20 and 20' have preferably two amplification stages 21, 21' (A1) and 22, 22' (A2). A gain flattening module 23, 23' and a dispersion compensation module (DCM) 25, 25' are connected between stages A1 and A2 in most configurations. The dynamic gain equalizer DGE 23, 23' is provided to ensure that an optimal power profile is maintained along the line. DCM 25, 25' provides advanced fiber-based slope-matched dispersion compensation. Adjustable (tunable) DCMs can also be used in some instances. In some cases, the DGE is not used, a static gain equalizer and a variable optical attenuator VOA being instead connected in the mid-stage of EDFA unit. Embodiments with a VOA are preferably used in the preamplifier configurations, but also in some line amplifiers, as described in connection with the composite span loop (FIG. 6C).

Figure 3A:
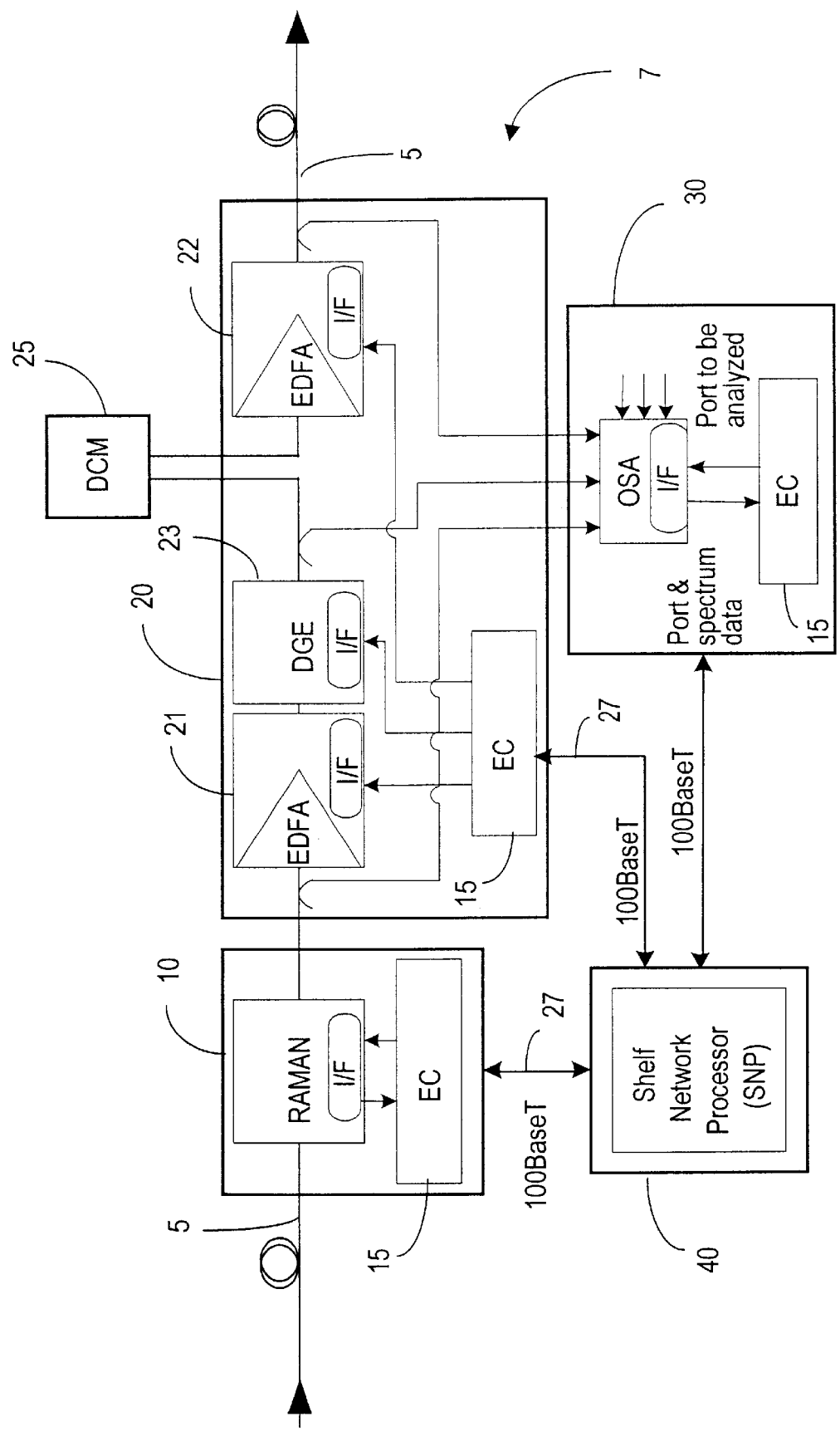
FIG. 3A is a block diagram of an embodiment of the ultra-long haul optical line amplifier according to the invention.

A multiple port optical spectrum analyzer (OSA) 30 is used for providing visibility of signal power levels and noise levels. As shown in FIG. 3A and discusses in further detail later, OSA 30 is shared with a number of line amplifiers.

Figure 2C:
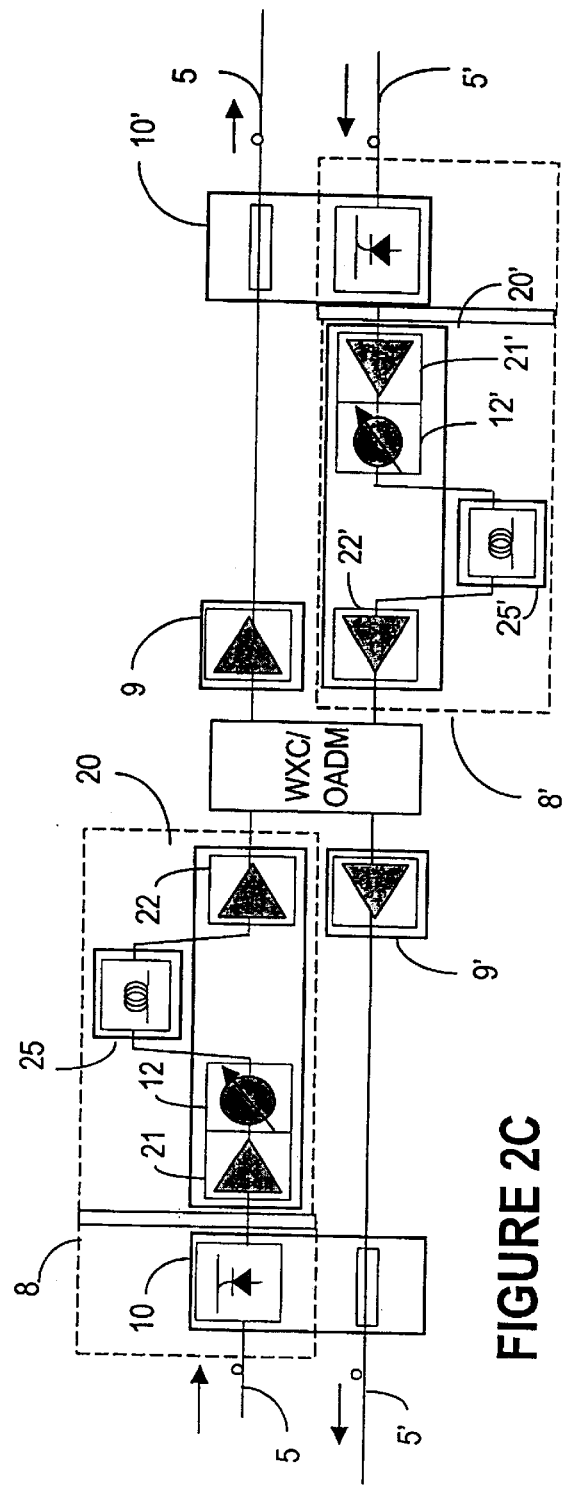
FIG. 2C shows an embodiment of a pre and post amplifier configuration at a flexibility site of network of FIG. 1.

FIG. 2C shows the line amplification system at a flexibility site. In this case, a preamplifier 8, 8' is provided on the input side of the node for compensating for the loss along the preceding span. It is to be noted that the hardware configuration is similar to that of the line amplifier 7; however the DGE 23 is replaced in this case with a VOA 12, since gain flattening is performed by some other optical modules inherently present at the flexibility site. Also, the preamplifier 8 may have specifications that are different from that of line amplifier 7.

FIG. 2C also shows a postamplifier (a booster) 9 for the forward direction and a booster 9' for the reverse direction, which are also EDFA stages. Boosters 9 and 9' amplify the WDM signal before exiting the flexibility site in the respective direction.

Network 1 is scalable which means that both the switching nodes and the line amplification system 6 are scalable; if new channels are added or channels are removed from the respective link, the line amplification system adapts itself to the new bandwidth while maintaining the performance in the preset ranges. In addition, if a new fiber is deployed between two flexibility sites (and the associated equipment at these flexibility sites), a new line amplification system can be readily connected on the newly deployed fiber by merely connecting the equipment at the respective amplification sites. The network will recognize the added equipment and will reconfigure itself accordingly.

Also, the line amplification system 6 is modular thus providing a number of configurations that are used in the network 1 as/where needed. As seen above, the units can be used both on the line, as an optical line amplifier, or/and at the flexibility sites in a preamplifier configuration. Some configurations may not require DCMs, for example in dispersion managed cable (DMC) applications. Also, some configurations may use fixed gain flattening filters and a VOA 12 instead of a DGE 23. Furthermore, some line amplifiers following after shorter spans may not need the full complement of amplifier stages.

The line amplification system is designed for a wavelength plan which provides approximately 100 wavelengths on a 50 GHz grid from 1565 nm to 1610 nm (i.e. L-band) and yields approximately 1 Tb/s per amplifier. The average amplifier span length is between 80 and 100 km. It is to be noted that other specifications can be used for the line amplification system, the above is given by way of example.

As discussed above, in traditional systems, all wavelengths originate at one location and propagate together down the fiber to the next location, where the optical layer is terminated. This simplifies the line design since all the wavelengths have approximately the same distortion, noise and see the same dispersion. On the other hand, in network 1 there is no such start and stop location for all the wavelengths. One wavelength may originate locally, while the next from a thousand kilometers to the East and the next from 2000 km to the North, etc. No assumptions can be made about the OSNR or distortion/dispersion history of adjacent wavelengths being similar. Furthermore, wavelengths need to be added and dropped at each flexibility site with a minimal impact on co-propagating channels. Therefore, the optical layer for network 1 requires a different design approach than traditional WDM systems, based on the following design principles:

1. Equalization must be done only on optical channel power, not on relative OSNR.
2. Dispersion compensation must be periodic along the length of the optical path and the link dispersion is adjusted according to the fiber type so that all links have a target dispersion per kilometer.
3. Channel to channel interactions must be minimized by reducing the optical launch power.
4. Pre and post dispersion compensation (if required) must be done on a channel-by-channel basis on the client side of the WXC/OADM nodes.

FIG. 3A shows a block diagram of a unidirectional line amplifier configuration according to the invention in more details, illustrating also the units of the signaling and control system 4 pertinent to the line amplification system. These are the embedded controllers 15 provided on units 10, 20, 30 and a shelf network processor SNP 40. The line amplifier 7 and the shelf processor 40 are arranged in a shelf at the respective amplification site as shown for example in FIG. 4, and the shelf processor 40 communicates with the embedded controllers 15 over a site LAN 27 provided on the backplane. This communication includes, from the modules to the shelf processor 40, information regarding the respective module state, specification, and actual parameters measured by the OSA 30 or by the modules themselves, and from the shelf processor 40 to the modules, module control (e.g. operation targets) information. When a new module is added/removed to/from the shelf, the shelf processor verifies the legitimacy of the new configuration, and if correct, it will include the new module in the current configuration and communicate with it along LAN 27.

Figure 3B:
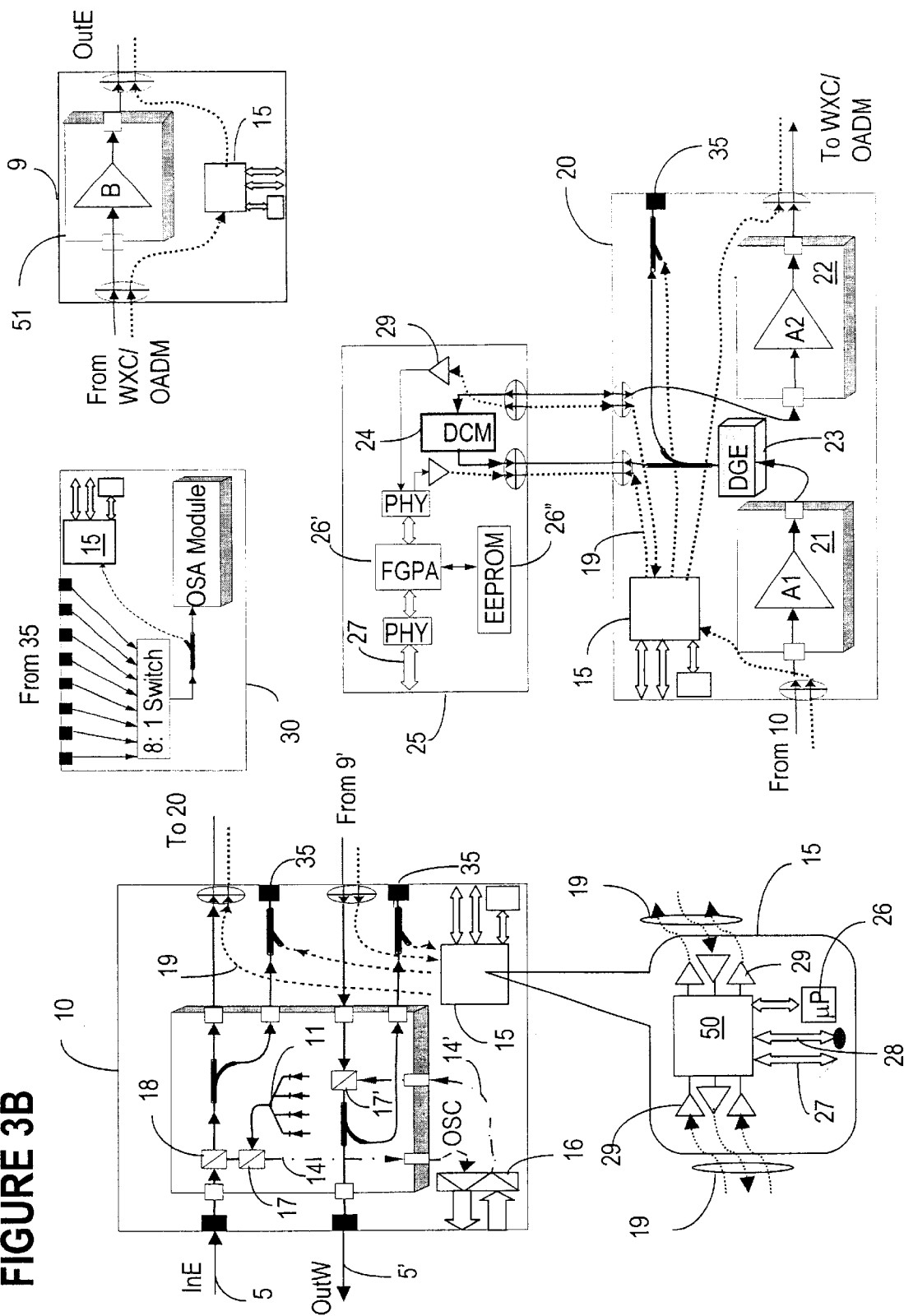
FIG. 3B shows the schematics of the modules of the optical line amplification system.

Description of the optical modules of the line amplification system is provided next in connection with FIGS. 3A and 3B.

a) Raman amplification unit RA 10.

RA 10 combines and reverse-pumps light into the fiber, using directional WDM couplers 17 and 18, which also isolate the pumps wavelengths from traveling forward. The forward-traveling DWDM signal experiences gain via Stimulated Raman Scattering. For operation in L-band, the Raman pumps wavelengths are selected in the region of 1480 nm. In the example of FIG. 3B, there are four pumps 11 using two wavelengths of depolarized light. The pump powers are selected in a certain ratio to each other.

The forward traveling (Eastbound) WDM signal arrives at unit 10 from West forward fiber 5 and exits unit 10 after the coupler 18, from where it is connected to the input of unit 20. The reverse WDM line signal also passes through the Raman unit 10; it enters the unit on a connection from the postamplifier 9' provided on the reverse traveling (Westbound) WDM signal and exits the amplifier at output marked OutW (from Westbound) on reverse fiber 5', as seen better on FIGS. 2A and 2B. It is to be noted that forward, reverse, Eastbound and Westbound are relative terms used herein in association with the drawings; other definitions may also be used to show bidirectionality of the signal and the amplification nodes.

As also indicated in connection with FIG. 3A, unit 10 is provided with an embedded controller (EC) 15, shown in some detail in the insert. EC 15 is responsible with performance monitoring, fault sectionalization, signaling, and data communication. Also, controller 15 performs per fiber node-to-node OAM&P (operation, administration and provisioning), per wavelength end-to-end optimization, and control of wavelength and power, such as per-wavelength locking to ITU grid.

There are two control channels accessing the unit 10 (and all other optical modules) which travel along connections 19 shown in dotted line on FIG. 3B. These are an optical trace channel (OTC) and an optical control channel (OCC). The OTC is a unidirectional link used to auto-discover network topology and to verify proper fiber connectivity between modules. The OCC is a bidirectional link used for communications between the embedded transponders and a node controller, and is not relevant to this invention. Additional functionality may be assigned to this channel, as the need arises. For example, the OCC/OTC can be used for unidirectional communication. This channel(s) is either coupled with the WDM data on shared fiber using an out-of band wavelength (e.g. 1310 nm), or has its own dedicated fiber. In the case of the OCC/OTC using a dedicated fiber, a tandem fiber cable may be used. The connections for the OCC/OTC channel 19 are also referred to as 'trace' for simplicity.

Ethernet layer devices and Ethernet bridges are used to provide the OTC/OCC functionality. Thus, embedded controller 15 comprises, in the embodiment used for units 9, 10, 20 a bridge 50 and a micro-controller 26 connected to the bridge 50 over a local interface. Bridge 50 is preferably an 8-port bridge for distributing the trace signals 19 to the modules connected to the host module. One port is used for connecting the host module to the shelf network processor SNP 40 (shown in FIG. 3A) over interface 27, and another port is used to facilitate local craft access, as shown by interface 28. Interfaces 27 and 28 may use for example a 100Base-T. Item 29 illustrates a transmitter or a receiver, as appropriate for the respective connection.

Another control channel used in network 1 is OSC 14, 14' (optical service channel) connecting all nodes of the network 1 which is used to monitor the integrity of the line system. All service information necessary for proper operation of the network is transported between the sites (i.e. optical amplification sites and flexibility sites) by this channel. The OSC 14 is a bidirectional packet over SONET (POS) channel operating preferably at 1510 nm. Preferably, the forward OSC 14 is decoupled from the forward fiber 5 by a WDM splitter 17 in conjunction with coupler 18 and the reverse OSC is multiplexed over the reverse fiber 5' by WDM coupler 17' at Raman unit 10. In fact, the output WDM signal on a reverse line is passed through a Raman unit 10 for the forward direction (and vice-versa) for taking advantage of the access to the OSC provided on this unit. This is better shown on FIGS. 2A and 2B, where the output of stage 22' is routed over to the Raman unit 10, and on FIG. 2C for a flexibility site, where the output of booster 9' is routed over to the Raman unit 10.

The bidirectional OSC, decoupled at the Raman unit 10 is passed to the shelf network processor 40 using a transmitter/receiver pair denoted with 16. Raman unit provides access to OSC 30 for both Westbound and Eastbound directions at taps 35. The taps are used in the span control loop, as described later, which controls, among other parameters, the pumps 11 based on a target gain. This gain can be fixed, but is preferably not: a fixed gain limits the application of the hardware configuration to a small range of fiber losses, because of the gain tilt induced in the EDFAs in the line.

Raman unit 10 is also provided with a reflection monitor for safety and monitoring. Pump control takes into account the actual specification of the span and provides for various optimization of the line amplification system as described later.

b) EDFA unit 20 and booster 9.

The mid-stage access optical amplifier comprises two Erbium doped fiber amplifier (EDFA) stages 21 (A1) and 22 (A2), which amplify all wavelengths in the respective direction. FIGS. 3A and 3B show the stages for the forward (West-to-East) direction; the respective node may also be equipped with a similar combination for the reverse direction, if needed/desired, as shown in FIGS. 2A and 2B. Each EDFA stage is equipped with input and output power monitors and with an output reflection monitor, providing a fast control loop for controlling pump operation using a fraction of the optical signal tapped at the respective input and output of the active fiber (not shown). The power monitors operate based on the total power (for all channels), and also provide gain control to some extent (see also FIG. 6A and associated text). This allows for fast adjustment of the pump power as the channels are added to or removed from the WDM signal, and provides some gain transient suppression with a time constant measured in the millisecond range.

The distribution of the gain along the length of an amplifier is important in minimizing the ASE noise. A lower OSNR is obtained by providing a higher gain for stage A2 than that of stage A1. Also, L-band EDFAs are preferred to C-band variants because they have a flatter spectrum. Due to the temperature effects, high performance is obtained for operation in L-band using temperature controlled erbium doped fiber, (with the fiber heated at approximately 60° C.). All these controls are provided within the respective stage and the module specification is available at the respective EC 15.

A booster 9, also shown on FIG. 3B, is generally connected at the output of the flexibility sites as shown in FIG. 2A and 2C. However, booster 9 may not be needed in all configurations; use of a separate booster unit allows for further flexibility of the line amplification system. Embedded controller 15 and OCC/OTC connections are also provided on this unit.

c) Dynamic gain equalizer DGE 23.

A dynamic gain equalizer (also known as a dynamic gain flattening filter DGFF) 23 is connected in most line amplifier configurations between the EDFA stages 21 and 22 to flatten out the powers of specific wavelengths. Tap 35 allows measurement of the optical power and spectrum and is used in the span loop for gain flattening control. Unit 23 is designed to allow operation with a single channel, in conjunction with a lowered amplifier output power.

In shorter links (with fewer optical amplifiers between the flexibility sites), it may be possible to eliminate the DGEs entirely. In the case when DGEs 23 are not included at each amplifier site, then VOAs 12 may be needed to compensate for amplifier gain tilt due to span loss variations. Also, a VOA 12 is preferred for the pre-amplifier configuration since it is less expensive and also since gain flattening is inherently performed by other units present at such sites. In the following, an EDFA unit with a DGE is denoted with 20D, and an EDFA unit with a VOA is denoted with 20V.

d) Dispersion compensation module DCM 25.

Dispersion management is the most critical and operationally difficult aspect of ultra long reach systems. In general dispersion maps must be customized to fiber types and the tolerances are such that insitu measurement and component selection are required, significantly complicating the system deployment.

Dispersion management for the line amplified system of network 1 is performed on an optical link basis, i.e. between flexibility points. Each link, except for the dispersion managed cable case, is compensated using 100% slope compensated static dispersion compensators 24 so that the net dispersion per km meets a design target. The compensators 24 are selected by measuring the net dispersion of the link, and a corresponding dispersion compensating unit DCM 25 is connected between the two amplification stages 21 and 22. A DCM 25 may not be needed at each optical amplifier site, resulting in some cost reduction for the line system due to the modularity of the line amplification system.

In general, the chromatic dispersion (CD) compensation is performed using fixed compensators 24 along the link and at the flexibility site preamplifier. Some systems 6 may use tunable DCMs, preferably at the end of an optical link, to null out any variations in the match between the static DCMs and the fiber on that link.

Network 1 is provided with 'in skin' dispersion measurement capabilities. It is a requirement that all wavelengths meet the dispersion window set for each link, so that the (tunable) dispersion compensator at the end of the link may also have to have a variable dispersion slope.

For cases where 100% slope compensated compensators are not available, a slope correction scheme can be used for the respective link, by utilizing a tunable dispersion compensator with fixed but selectable slope.

FGPA 26' and an EEPROM 26" provide trace functionality on the DCM 25.

e) Multiport Optical Spectrum Analyzer OSA 30

As indicated before, power and noise measurements are performed using a multiport OSA 30 provided at a line amplifier site. A unit 30 is shared using for example an 8:1 optical switch coupled to in-line power taps at a number of test points 35, provided on Raman unit 10 and on the DGE 23. These taps are used in control loops. Fault monitoring also relies on this information to localize failures in the network. Sharing of an OSA by the modules in the network allows minimizing the costs. Of course, the power may be measured in other points of the transmission line, as needed, FIG. 3B provides an example.

Figure 4:
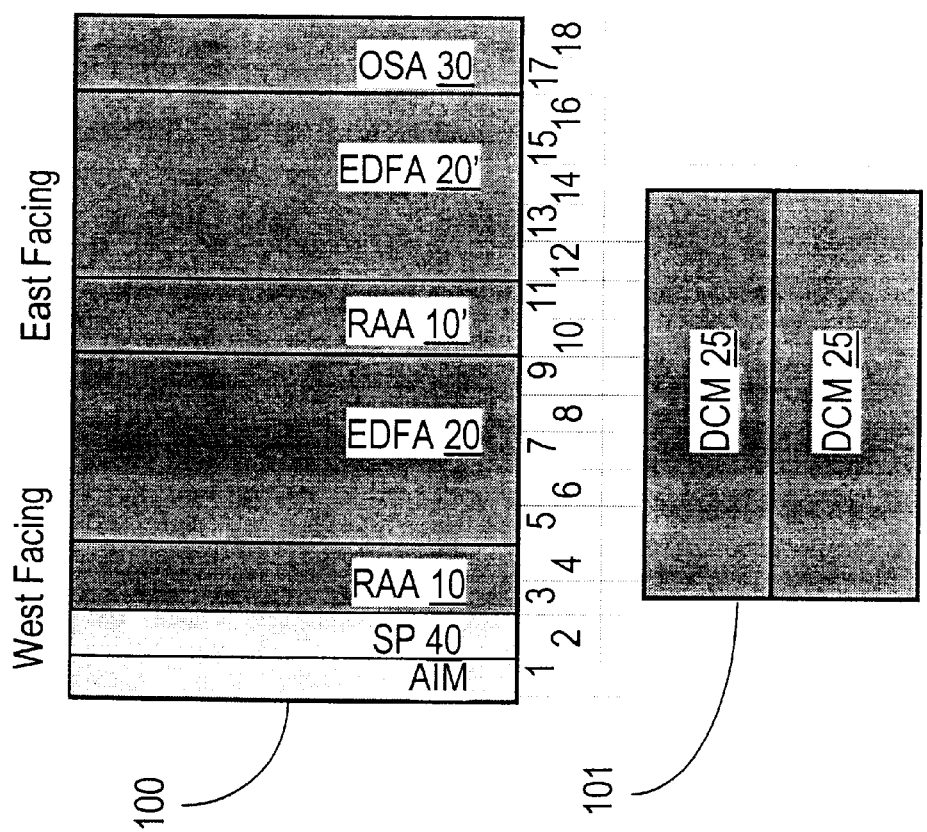
FIG. 4 shows a line amplifier shelf.

FIG. 4 show an example of how the modules of an optical line amplifier 7 may be arranged in the slots of a shelf 100 at a line amplification site. There could be a maximum of three OA shelves per rack at an OA site.

For the line amplifier sites, the DCM unit 25 is provided on a subtended shelf 101 mounted underneath the OA shelf 100. The DCM shelf 101 allows airflow through so as not to hinder the cooling of the OA shelf above. The arrangement of card-packs on the preamplifier shelf is somewhat different, in that the DCM in this case is provided in a regular transversal slot, and also the shelf may comprise card-packs specific to the flexibility site.

It is to be noted that other variants may also be possible. Noteworthy for this specification is that each shelf of the line amplification system, as all shelves in network 1, has the same back-plane connectivity irrespective of the shelf type, and is equipped with a shelf processor SP 40 and an alarm interface card AIM.

Line management and control system

Figure 5A:
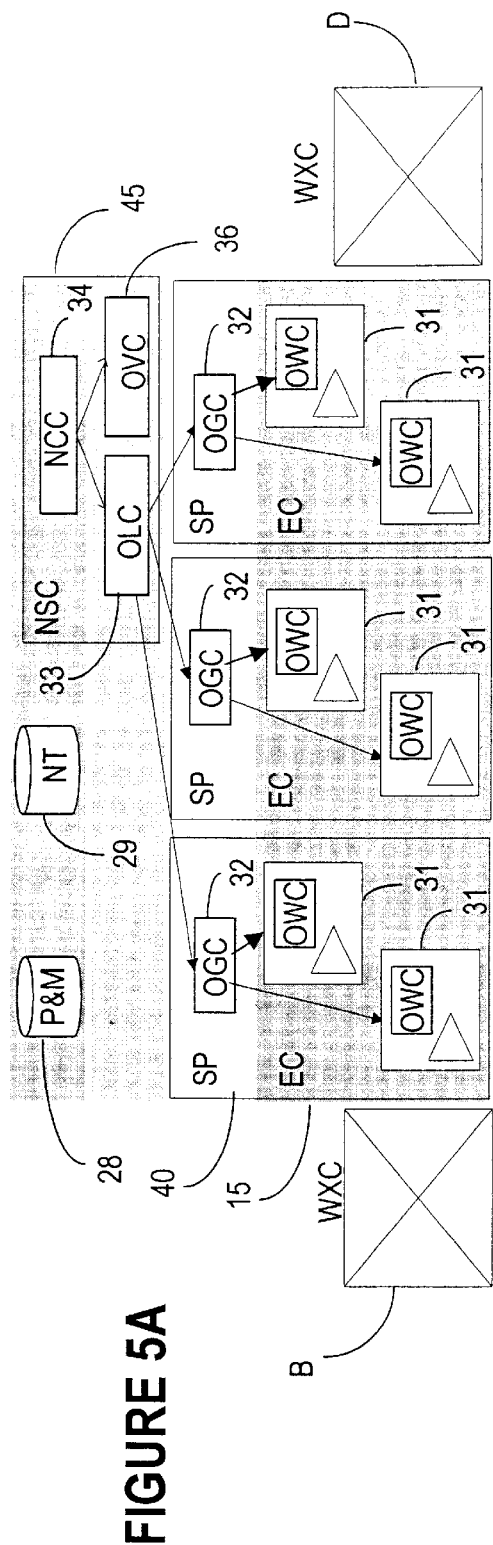
FIG. 5A is a block diagram of the entities involved in the control of an optical path.

The software architecture of network 1 has a layered structure as shown in FIG. 5A. As indicated in connection with FIGS. 3A and 3B, all the card-packs are provided with embedded controllers 15 shown at the base layer in FIG. 5A. The card packs are connected to each-other over OTC 19, while controllers 15 and the shelf processor SP 40, shown at the next architectural level, are connected over the backplane, forming a local point-to-point shelf LAN. Based on network topology information received over the backplane and on pre-stored templates, SP 40 determines type and presence/absence of card packs in the respective shelf. Each card is given a unique address in this LAN. Ethernet Physical layer devices and Ethernet bridges are used, as described in connection with FIG. 3B, to provide the physical layer and the required layer two switching.

At the next architectural level, each flexibility site is equipped with a network services controller NSC 45 for providing network 1 with control, signaling and routing capabilities. OTC supports tracing between circuit-packs at a flexibility site. A plurality of shelf processors 40 present at that site are connected to each other and to the NSC 45 forming an internal site LAN, the SPs acting as routers between the shelf LANs. The NSC maintains a MIB (management information base), which contains all remotely accessible OAM&P (operation, administration, maintenance and provisioning) data for its span of control, and has a data collection and consolidation role between the internal data communication network and the customer data communication networks. It also distributes the IP addresses to the shelf processors and to the embedded controllers 15 (through the respective shelf processor 40). The data protocol for the site LAN could be based on the 100BASE-T Ethernet protocol, operating at a data rate of up to 100 Mb/s. Other protocols can also be used.

The line control system has also a layered architecture, following-up the structure shown in FIG. 5A.

Thus, the optical Widget Controllers (OWC) 31 provide the interfaces to the various optical modules that make up network 1, and in the particular case of the line amplification system, with the RA10, EDFA stages 21, 22 and booster 9. The OWC 31 resides on the controller 15 and facilitates setting of control targets to the optical modules, reading of run-time data, and interception of asynchronous events from the optical modules. Vendor-specific details are contained within the optical device drivers implemented for the control object interface functions, i.e. the optical modules store their own specifications.

A line amplifier Optical Group Controller (OGC) 32 coordinates the actions of the various optical modules in a line amplifier group, to achieve a control objective for the amplifier as a whole. The OGC 32 resides on the shelf processor 40 and communicates to the amplifier OWC's via the shelf LAN.

An OGC 32 of the line amplification system takes an output gain profile as its control target. It manipulates the control targets of the Raman 10, EDFA sections 21, 22, and DGE 25 to achieve the output profile target, whilst ensuring that amplifier group constraints are met (e.g. the peak power into the DCM is below a fiber type specific threshold).

An Optical Link Controller (OLC) 33 is responsible for all control activities that fall within the scope of a single link. Specifically, the OLC 33 is responsible for commissioning and certifying the link, re-provisioning the OGCs 32 as required following power cycles and certain restart scenarios, link channel quality testing, periodic link channel monitoring.

Commissioning the link implies applying initial startup control targets to all OGCs in the link, and running an iterative distributed algorithm to optimize the link performance. Certifying the link implies connecting a transmitter/ receiver at each end of the link and cycling through all supported wavelengths to ensure that the quality of each wavelength is at an in-service level. In any restart/recovery scenario in which the OGC 32 is unable to recover its provisioned control targets locally, it is up to the OLC 33 to re-provision those targets.

Link channel quality testing is performed for example during light-path setup, when the quality of each channel is measured at the ends of each link to ensure that their performance exceeds a pre-defined margin. The pre-defined margin consists of a system margin and a wavelength-loading margin. Details on these margins and how path monitoring and maintenance are performed are provided in U.S. patent application entitled "Method for Engineering connections in a dynamically Reconfigurable Photonic Switched Network" (Zhou et al.) on which this specification bases its priority.

In order to perform wavelength quality validation, a receiver per input line to each WXC may be reserved for the use of the OLC 33. In its application interface, the OLC provides two primitives for performing wavelength quality validation against the system and wavelength loading margins. The first one performs the checking using the OLCs dedicated receiver. The second primitive allows the OLC client to specify a receiver on which the validation is to be performed. The second one is also required in the case where a regenerator or interface transponder is already terminating the wavelength on the link.

The OLC 33 also continually validates the quality of all wavelengths on the link under its control using dedicated receivers. The OLC 33 issues an alarm whenever a wavelength operates below a respective channel predefined margin.

An optical vertex controller OVC 36 is responsible for connection and power control through the wavelength switch. Connection and control of interface transponders, regenerators and wavelength translators also falls within the scope of the OVC 36, which are not however the object of this invention, so that further details are not provided.

A network connections controller (NCC) 34 provides the type of the actual connection at a node (connect through, connect a regenerator, connect access and connect a receiver) and accomplishes the end-to-end light-path set-up by coordinating activities of various OLCs 33 and OVCs 36 along the light path route.

NCC 34 collects performance data from the line control system, as shown generically by performance and monitoring P&M database 28, and connectivity data for the respective end-end path from a topology database 29. Database 28 may also maintain user-defined thresholds for these parameters. Based on this real time performance information and on thresholds preset for the monitored parameters, the management platform 3 (see FIG. 1) or the user decides if a channel needs regeneration or wavelength conversion (upgrade), or decides on an alternative route for traffic optimization. Details about this functionality are provided in the above-identified patent application (Zhou et al.)

Figure 5B:
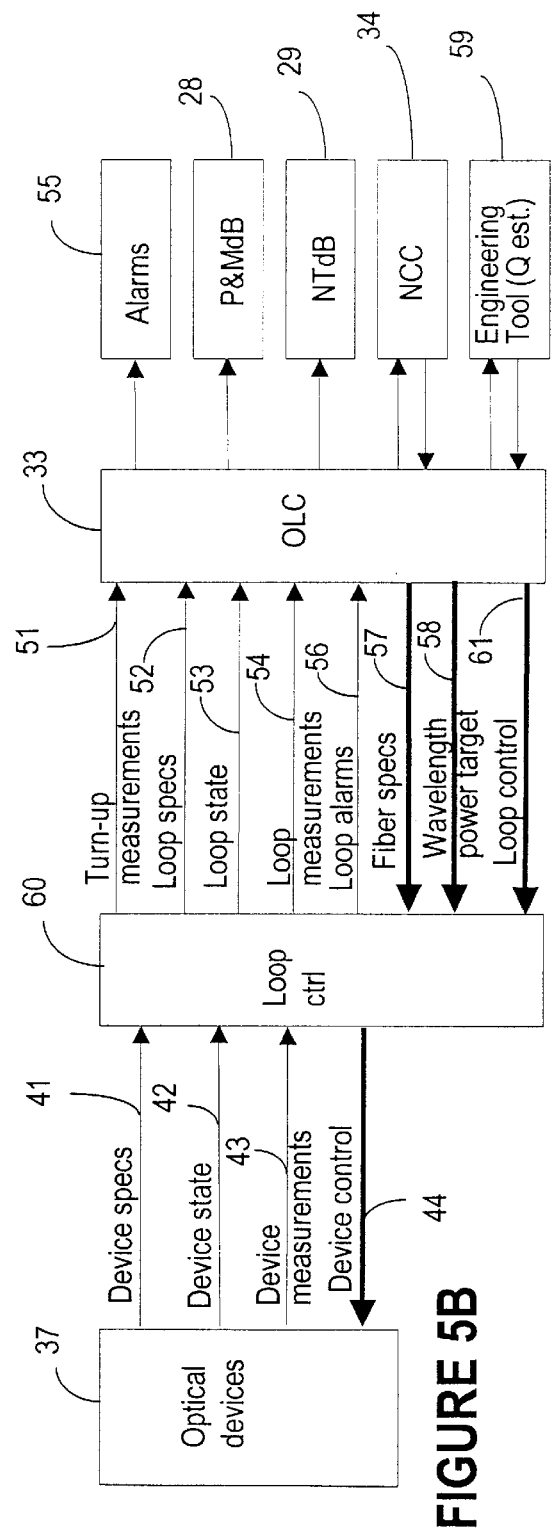
FIG. 5B illustrates the flow of information between the optical devices, the line control system and the network operating system.

The type of information exchanged between these control entities is shown in FIG. 5B. There are three levels of control shown generically on FIG. 5B, namely the loop level control, the link level control and the connection (or path, or network) level control.

As discussed previously, the optical devices 37 are provided with embedded controllers 15 connected over a standard backplane to the shelf processor 40. These are operated using control loops, provided for setting and maintaining the parameters of the network optical devices within the operational ranges, so that the network is unconditionally stable.

At the first level, a loop control 60 receives information, such as device specifications 41, device states 42, device measurements 43 from various optical devices 37 connected in the respective loop. The loop control 60 uses this information to control the device, by sending control information 44. An example of device specification is gain and power range for an optical amplifier. The loops are designed to allow a level of abstraction, such that changes can be made independently. For example, as the optical devices 37 store their own specifications, it is possible to change the device specifications without changing the loop control 60.

At the next level, the optical link controller 33 manages one or more span loop controls 60. It receives loop turn-up measurements 51, loop specification information 52, loop state information 53, loop measurements 54 and loop alarms 56. The span loop requires for example fiber type and wavelength power targets, so that the OLC 33 sends fiber specification 57 to the respective loop control 60. The OVC (optical vertex controller) 36 controls the switch and drop loops, that require wavelength power targets 58. Other control information 61 used to control the loops, includes e.g. dispersion targets for link commissioning, available launch power, etc.

Examples of turn-up measurements 51 are Raman gain, path loss, and module specifications including maximum DCM power. In response, the OLC 33 sends control signals such as link gain distribution, launch power range.

Examples of loop state information 52 are the number of active channels, gain degradation and pump power usage. In response, the OLC 33 sends control signals such as requests to modify link gain distribution and available launch power.

At the network control level, the OLC 33 transmits alarm information shown at 55, supplies performance and monitoring data to P&M database 28, and supplies topology data to topology database 29.

OLC 33 is controlled by a NCC 34, as also shown in FIG. 5A, and by an engineering tool 59. Engineering tool 59 estimates the optical path Q necessary for path selection and ordering, based on the link and span specifications for use in establishing an end-to-end path.

Figure 6A:
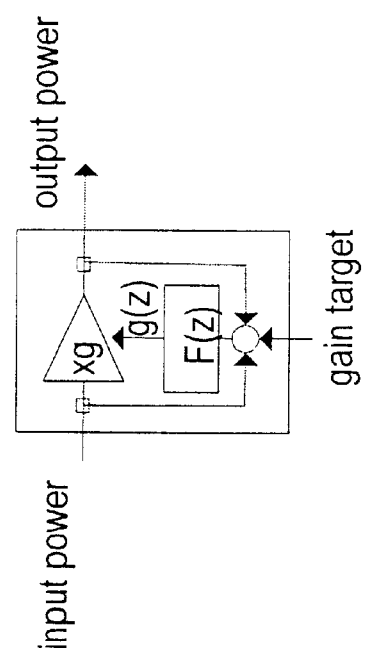
FIG. 6A illustrates an optical gain control loop.

FIG. 6A shows a gain loop, which is used for example by the EDFA stages 21 and 22, and booster 9. The gain loops used in network 1 use input and output powers measured by the input and output power monitors available on commercial EDFA modules, and a gain target based on the total power (the power of all channels). The measured gain is compared against the gain target and the pump currents are adjusted accordingly. The loop characteristics could be for example the bandwidth and the input and output slew rate. In a gain control loop, input and output sampling with a gain target confines the loop to respond to changes within its own domain, and reduces or eliminates the interaction with adjacent loops. The gain control signal is calculated such that the loop behaves as a linear time invariant (LTI) system.

Figure 6B:
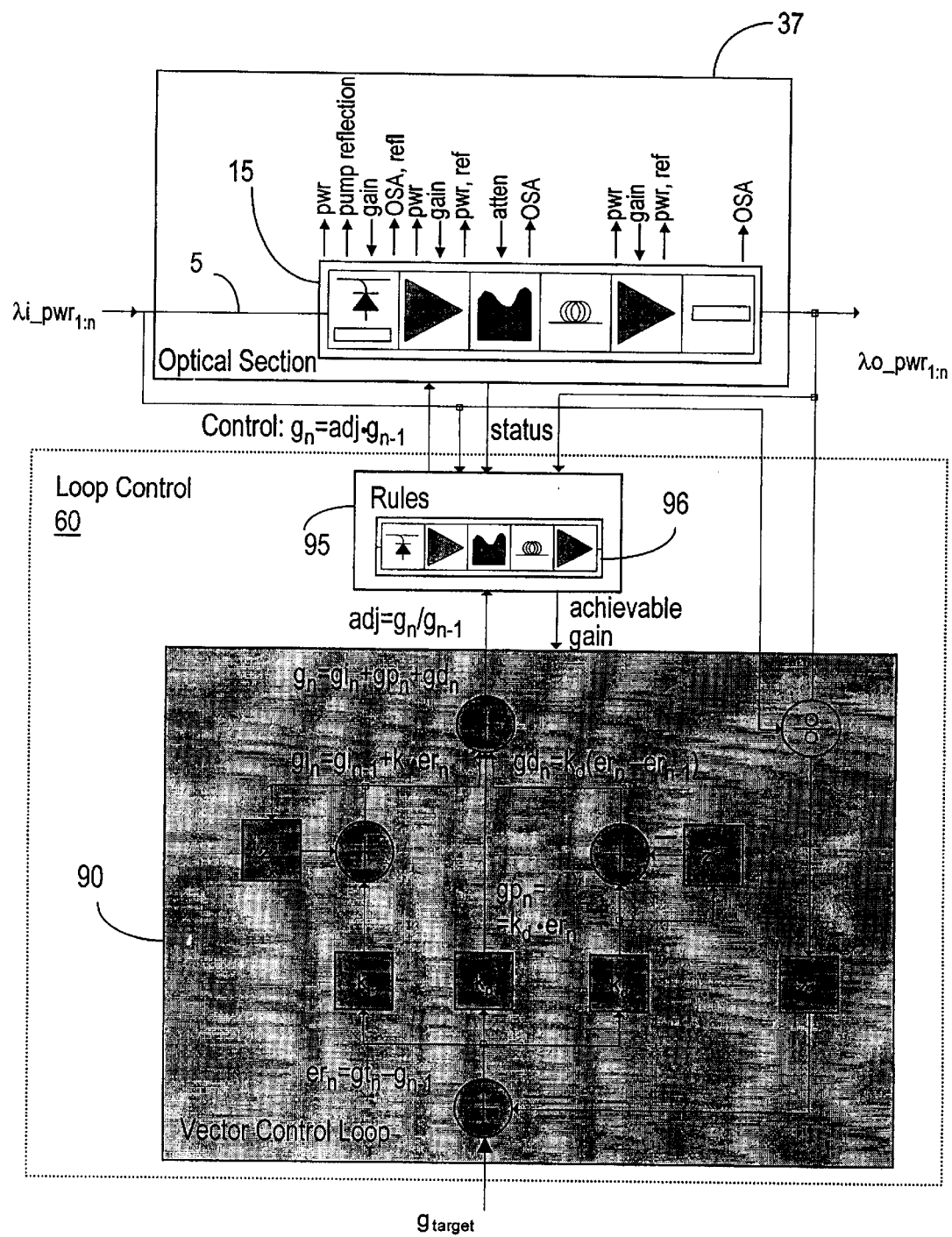
FIG. 6B illustrates an optical span control loop.
Figure 6C:
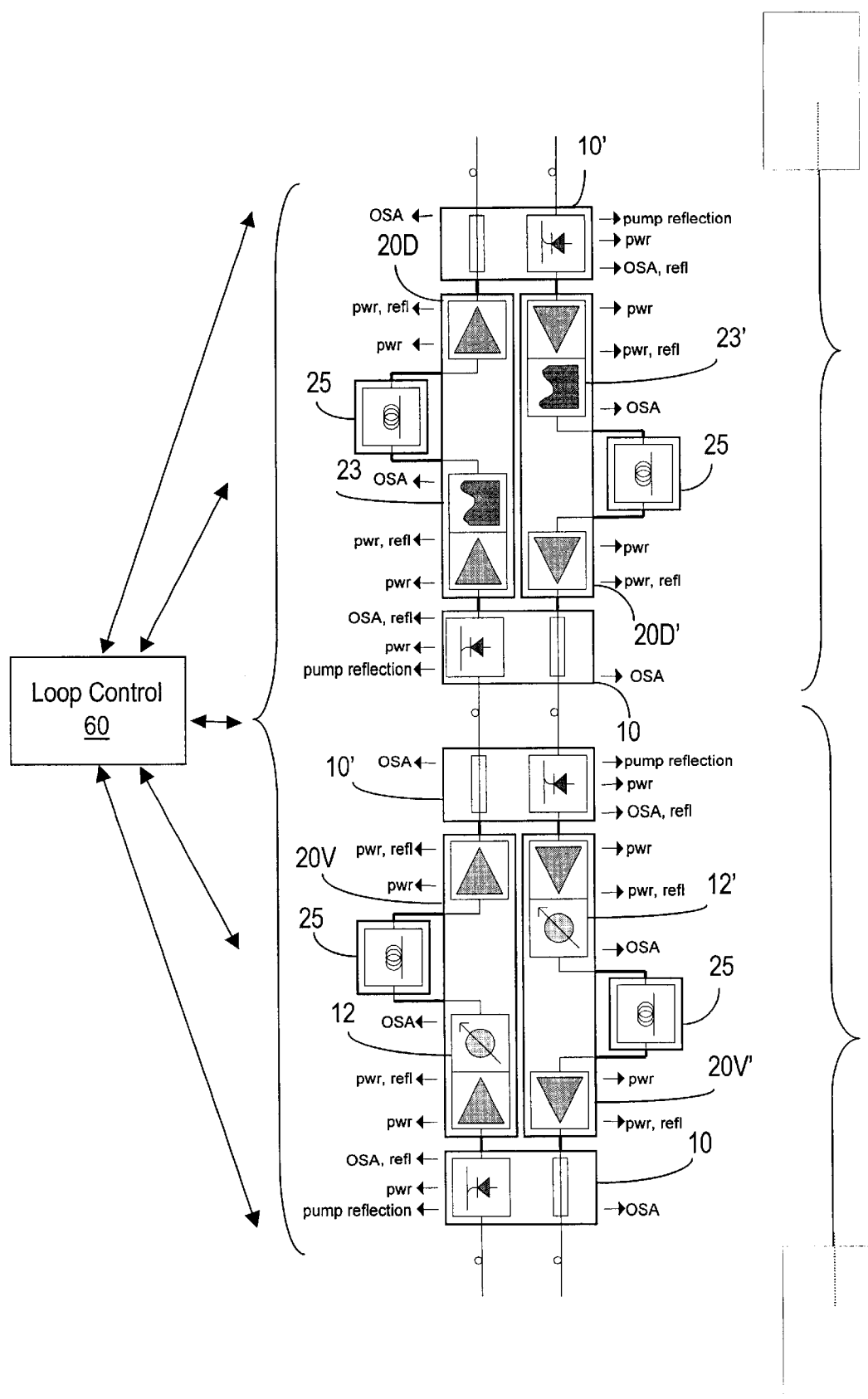
FIG. 6C shows an example of a composite span loop.

The span loop is a vector loop, as shown in FIG. 6B. It encompasses the fiber span 5 preceding a line amplifier 7 or preamplifier 8, the Raman unit 10 and the EDFA unit 20D.

As in the case of the EDFA loop, the span loop is operated as a gain loop, in order to minimize interaction between the loops along a link/path if the power were used as a target. Generally, a vector loop operates as shown by classical gain loop 90 on FIG. 6B. Namely, the loop has a target for a plurality 'n' of controlled entities, but does not operate as a set of 'n' independent loops. Classical vector loop 90 compares the output power and the input power (which is the launch power of the previous amplifier) against a per wavelength gain target $g_{target}$ to generate an error signal $er_n$ as a new target. The achievable gain for the respective amplifier is also input to the loop. The error signal generated is a vector with 'n' elements, and the loop seeks to minimize the energy of the error vector. The loop then uses constants $k_i$, $k_p$ and $k_d$ and filters $z^{-1}$ to specify loop response including bandwidth and stability. Thus, $k_i$ is the integral constant, $k_p$ is the proportional constant, and $k_d$ is the derivative constant. The output of the loop 90 is an adjust signal 'adj' which depends on the ratio between the current (n) and the past (n−1) gains.

$$adj = \frac{g_n}{g_{n-1}}$$

A control rules block 95 receives the "adj" signal and calculates a control signal which could also be a function of the present and past gains:

$$g_n = adj \cdot g_{n-1}$$

The control rules block 95 may be implemented as an expert system, using a span model 96. The control rules block 95 receives the input and output measurements and the current status of the entire span, and uses the model 96 for allocating individual controls to each module for adjusting the performance of the individual channels in the optical section. The measured data may include for example device data, device settings and several OSA and PIN measurements. As the measurement data include spectral power information measured by OSA unit in points 35, the loop is able to perform spectral power equalization, by compensating for amplifier ripple/tilt, systematic de/multiplexing, loss variation, spectral variation in the loss of the transmission fiber and/or dispersion compensation elements.

The model 96 is set using a plurality of measurements obtained during system installation and testing and measurements collected and updated with each new measurement. For example, the model may use constants from engineering tool, constants from components, design constants, measured values during installation, modes and operating range of each mode, alarm conditions. The model (and the control signal) is updated with each iteration of the measurements. The rules block 95 can also be instructed to add/remove a wavelength.

Although the loop targets are set during network installation, they are adjusted by a slow background loop to eliminate residual errors.

In summary, after examining the current status of the entire optical section and the new measurements and based on model 96 the control rule block 95 determines the best way to achieve the new target, whilst maximizing performance. The control signal adjusts accordingly the current of the Raman pump 11, the target gain of the EDFA stages 21 and 22 and the attenuation of the gain flattening module 23. Use of rules block 95 not only allows maximizing loop performance, but also allows enhancements and further intelligence to be added without directly impacting the stability of the loop.

There are three types of span loops. A first type uses an amplifier 20D with a dynamic gain equalizer DGE 23, as shown in FIG. 6B. A second type is provided at the input of the flexibility sites and uses an amplifier 20V with a VOA 12, and a third type of span loop is a composite loop, as shown in FIG. 6C.

The composite span loop encapsulates a first type span loop and one or more second type loops.

The span loop is a self-correcting gain loop. As indicated above, block 90 is a fast-response integrating filter that corrects for deviations from the gain target caused by components within the loop. A residual power loop (not shown) comprises a low frequency integrating filter placed between the output of the loop and the input of block 90 receives the input power target for the respective span, adjusts the loop gain target in response to deviations from the output power. The residual power loops in a wavelength path are connected in series. The gain target adjustment range is however limited. While the span loop is only able to correct a slow ripple of deviations along the wavelength axis (this is a DGE limitation), fast ripple and per wavelength perturbations are corrected by the switch loop, which is not the object of this specification.

As discussed in connection with FIGS. 3A and 3B, the power for each channel and the spectrum of the WDM signal along a certain line is measured in points shown at 35 at the input and output of the loop on Raman units 10, 10', and on DGE 23. OSA monitoring is however synchronized within the domain of a link. OSA monitoring runs continuously, the speed being limited by the OSA technology and the 1:8 OSA switch utilization; measurements using the same OSA cannot be effected simultaneously. These measurements are used along with their history and the current state of the loop to determine the best set of actions to correct the loop error.

Figure 6D:
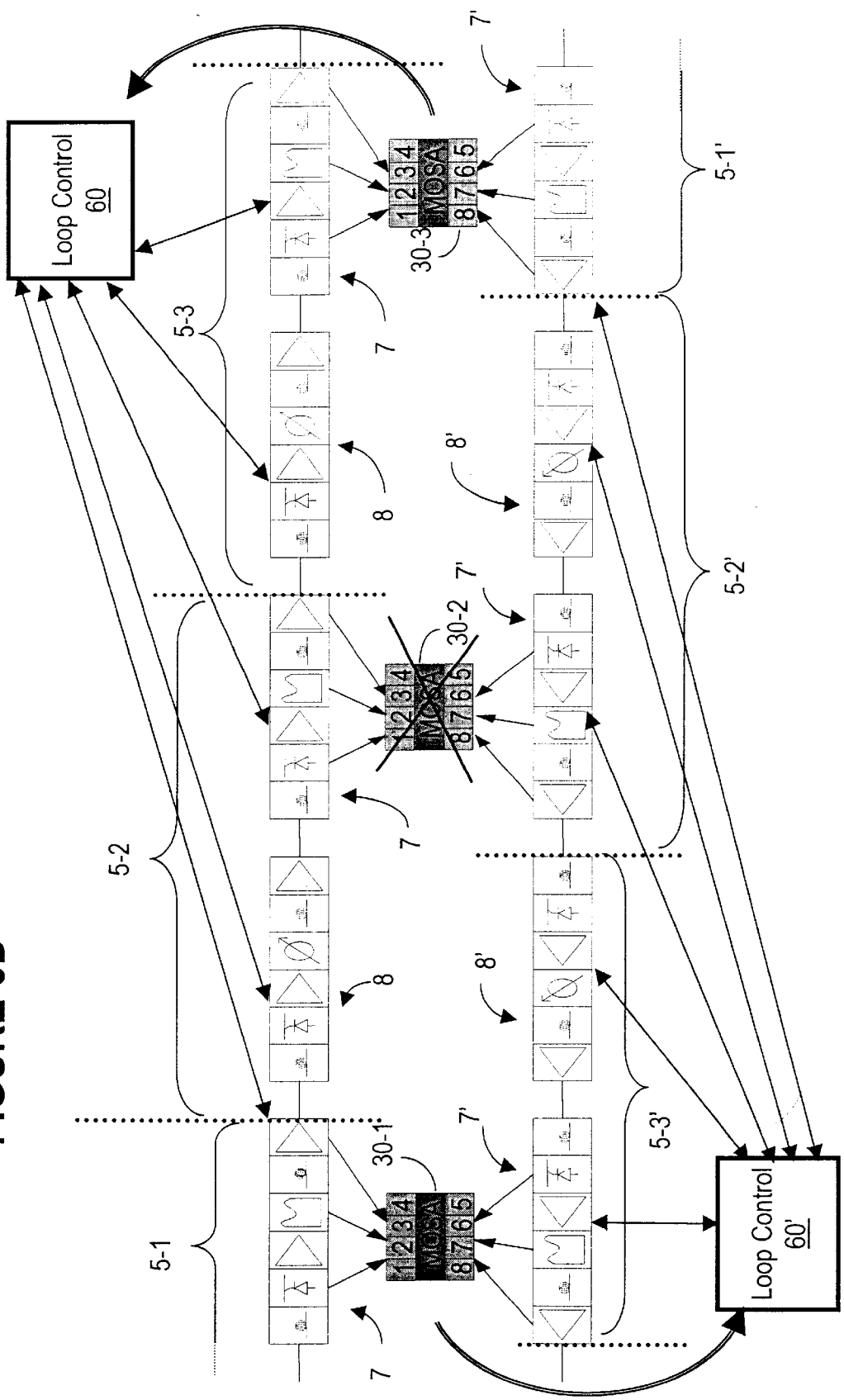
FIG. 6D shows an example of a super-span control loop.

As seen above, each loop gathers information from the optical modules and the OSAs 30 in the line, which originates from the respective amplifier unit 6 at the end of a span. Control rules block 95 allows extending the concept of 'span' to a 'super-span', shown in FIG. 6D. Each composite span loop 5-1, 5-2 and 5-3 of FIG. 6D encompasses a first type and a second type amplifier 7 and respectively 8 (amplifier 8 is not shown for composite loop 5-1), and a respective OSA 30-1, 30-2, 30-3 for providing power and spectrum measurements at the site of the amplifier 7. As mentioned, an amplifier 8 is not able to adjust the spectrum of the WDM signal, as it is not provided with a DGE 23, so that it is controlled from the site of the amplifier 7.

In the event of OSA 30-2 failure, the control rules of loop control 60 of composite span 5-3 can interpolate the spectra at the amplifier 7 of composite span loop 5-2, since no measurement is available at this site. A 'super-span' loop now includes both composite loops 5-3 and 5-2. For the reverse direction, loop control 60' of composite loop 5-3' interpolates the spectra at the amplifier 7 of the composite loop 5-2' and undertakes control of this composite loop. This is possible as the model 96, which represents the line, can predict the data where it is not available. This extension of control to the next available working site allows the control system to continue its operation, albeit with some reduced accuracy of optimization, to provide a very robust system overall.

Still further, this parenthetic redundancy can be performed automatically in the event of component failure, or manually in the case of a managed maintenance event (e.g. OSA swap-out or upgrade). This mode of operation allows the control system to continue operation, albeit with some reduced accuracy of optimization, and provide a more robust system than without this added functionality to the control rules of a loop span.

Optimization of line amplifier system

Each link of the line amplification system operates as described above under the control of a plurality of concatenated span control loops. This mode of operation allows optimizing the performance of a link, by improving/developing the line control system, without changes to the line amplification system hardware. Some optimizations of the line control system are described next.

Current hybrid (Raman/EDFA) optical amplifier systems use a fixed gain Raman stage. This mode of operation has the advantage of providing a relatively fixed gain non-uniformity (ripple) from the Raman stage, which can be corrected with a fixed gain flattening filter, generally placed in the Raman pump unit or in the following EDFA stage. This mode of operation provides a good performance of the optical amplifying system in the region of optimum span loss; however, the span loss varies within the line and from network to network, resulting in the Raman gain not being optimized for all channels, due to the gain tilt in the EDFA. This limits the application of the classic configurations to a small range of fiber losses.

The link performance may be optimized if the Raman amplifier gain is adjusted, as discussed next.

1) MPI optimization versus tilt

The maximum Raman gain is limited by the MPI (multi-path interference) induced penalty in the line. The line control system of network 1 provides means to limit the Raman gain for limiting the MPI induced penalties. This is achieved during each link commissioning (SLAT), when the gain of each Raman unit is set to the nominal value. Next, the link is noise-loaded until a measurable Q/BER is achieved. The gain of each Raman unit 10 is adjusted sequentially, walking down the line under software control. The gains are set up or down, until an optimum Q point is achieved for the respective link. The result is an OSNR optimized link.

2) System reach distribution optimization

Due to the gain tilt induced in the EDFAs stages 21 and 22, it is possible that in some instances a reduced number of channels will achieve the best performance that in a case without this optimization. To further optimize OSNR performance over the full channel count, the Raman gain is actively tilted by changing the ratio between the power of pumps 11, to equalize and minimize the noise performance across the entire transmission band.

Figure 7:
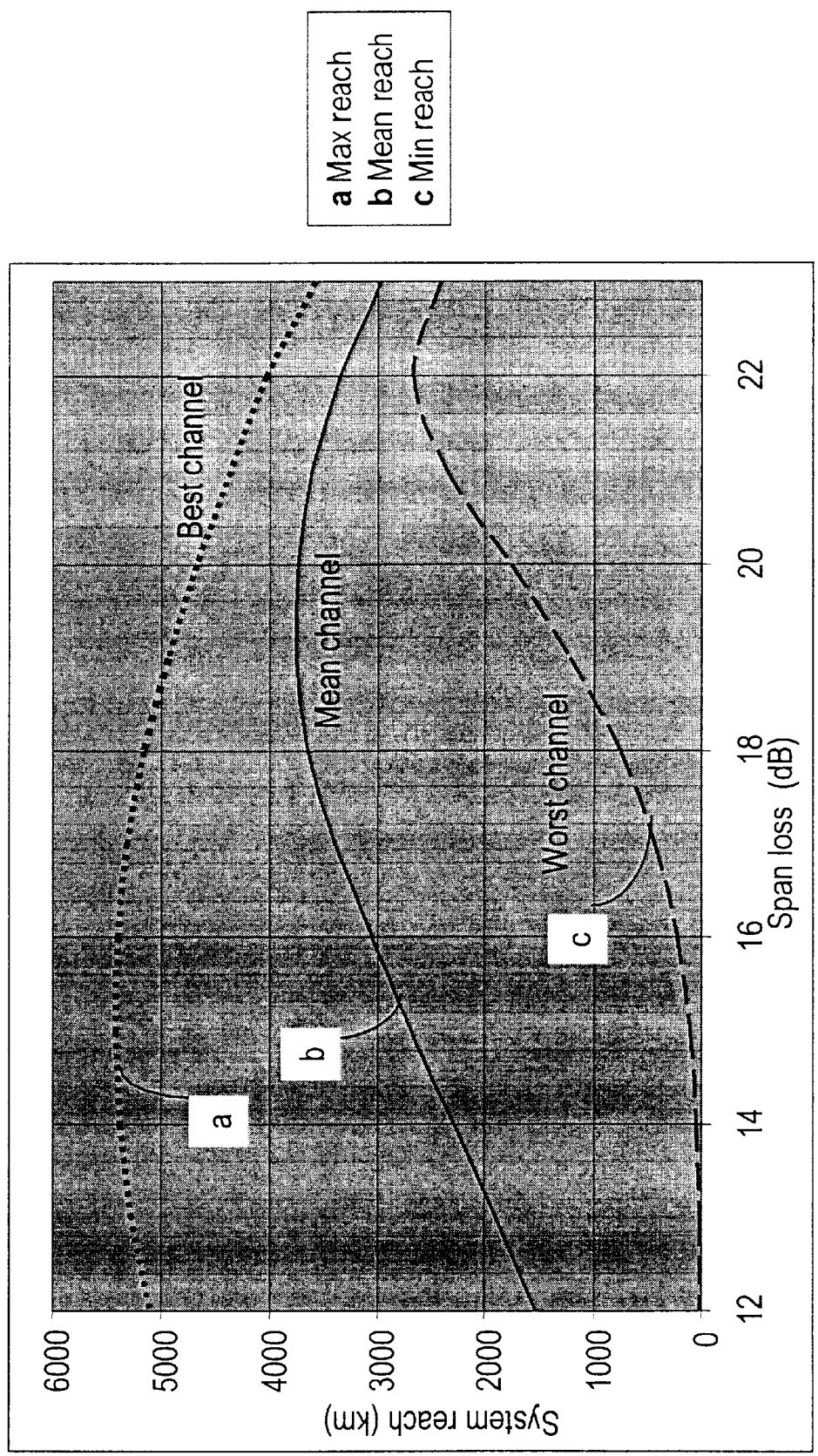
FIG. 7 shows the mean and extremes of the system reach distribution with span loss, using a line amplifier with fixed Raman gain and without optimization at EDFAs.

FIG. 7 is a graph showing the 'System reach distribution' versus 'Span loss', for a WDM signal, based on optical signal-to-noise ratio (OSNR). As seen on FIG. 7, while the performance of the best channels, shown by graph a and for the mean channels, shown by the graph b for configurations with a fixed Raman gain may be acceptable, the performance of worst channels, shown by graph c, is significantly worse. It is also to be noted that while the mean (average) performance is good over a large span range, not all the channels achieve such performance. This leads to limited capacity at spans away from the system optimization.

The gain provided by Raman unit and the associated fixed gain flattening filter 23 can be re-optimized for different system gains, but this leads to alternative parts, increasing the system inventory, deployment complexity and additional costs.

It has been determined that if the Raman gain is flexed to a certain value G_raman and the gain of the EDFA stages 21 and 22 is maintained constant, the performance of optical amplifier 6 is enhanced for a large number of channels. This is possible since the Raman gain is largely gain-tilt free, and it results in avoiding the gain tilt from the EDFA stages when operating away from the design flat gain.

Raman gain flexing can be obtained by applying a set of simple, general control rules, resulting in performance optimization for a particular system. These rules are expressed by EQ1, where the gain is given in logarithmic units.

$$G\_raman = G\_raman\_max - (Mean\_span\_loss - Actual\_span) \text{ If } G\_raman > G\_raman\_max, \text{ THEN } G\_raman = G\_raman\_max \quad \text{EQ1}$$

For example, if the mean span loss is 23 dB and the maximum allowable Raman gain is 15 dB, for an actual span loss of 20 dB, the set Raman gain is 12 dB.

The mean span loss can be chosen to address the largest range of systems as required, and the maximum Raman gain is determined by pump power availability or noise considerations (e.g. double Rayleigh scattering).

Application of the rules given by EQ1 corrects the rapidly increasing disparity between the best and worst channels caused by the gain tilt in the EDFAs, while maintaining the capacity optimized solution over the largest possible range of span losses.

The Raman gain when varied, is largely tilt free. The gain flattening module 23 can undertake compensation of any small ripple (Raman gain non-uniformity) along with other channel equalization through the span control loop.

Figure 8:
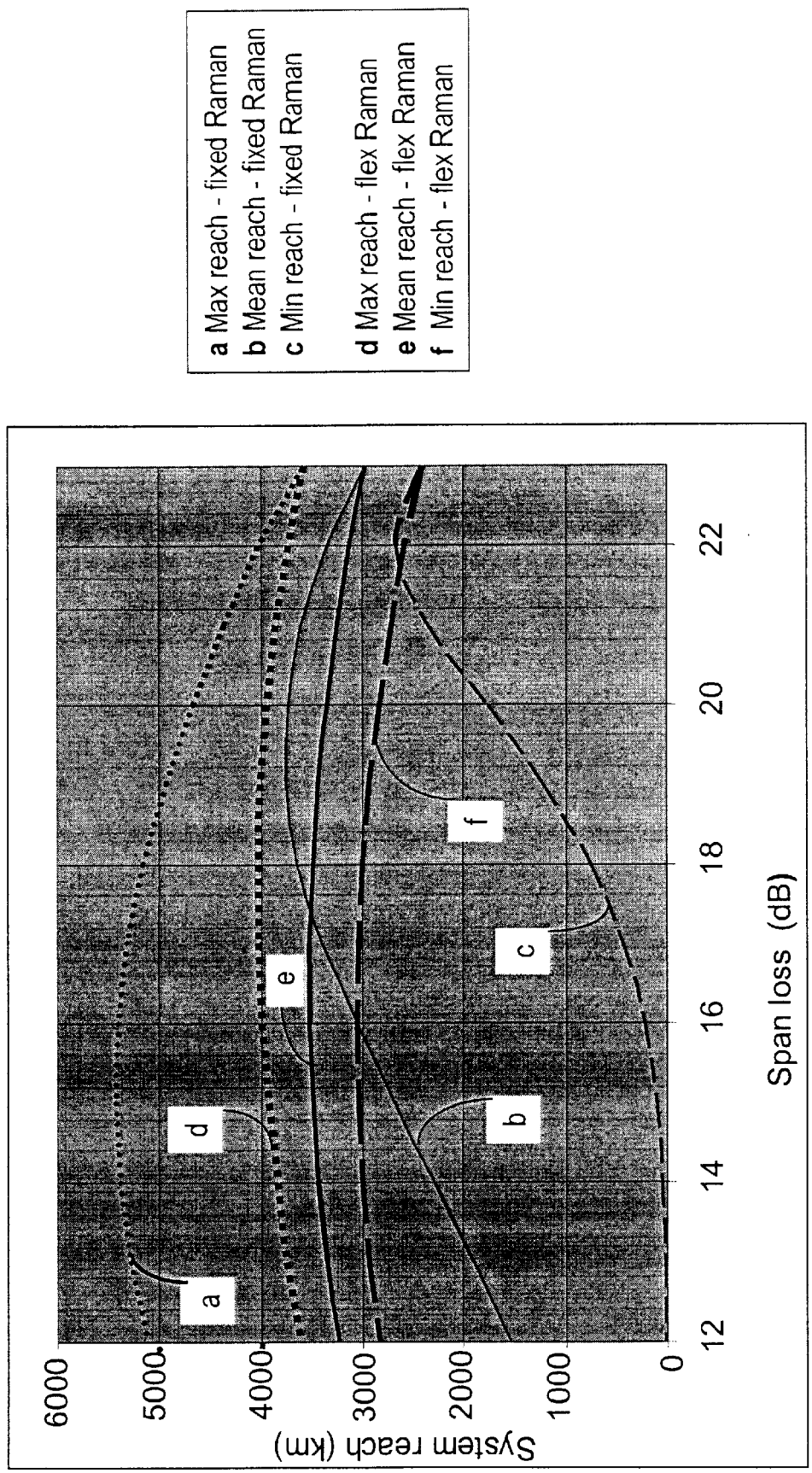
FIG. 8 shows the mean and extremes of the system reach distribution with span loss, using a line amplifier with flexed Raman gain.

The charts of FIG. 8 compares the 'System reach' with 'Span loss' obtained with this new control method for the best, mean and worst channels as shown by graphs d, e and f, with the results obtained with the previous scheme, shown by graphs a, b and c. For this graph, the Raman gain is flexed based again on knowledge of the span loss and maximum desirable Raman gain. As seen, the transmission optimization obtained by flexing the Raman gain according to the span loss gives the best performance to the full number of channels.

It can also be recognized that a range of possibilities exist between the two cases shown on FIG. 8. By modifying the control rule further, the line system can be additionally optimized based on the same hardware implementation, for a reduced capacity, but for an average increased performance. This can be valuable if a particular network requirement values additional reach over capacity. It can also be implemented on a pre-existing network configuration if traffic patterns change.

The modified rules could for example be as shown in EQ2:

$$G\_raman = G\_raman\_max - (Mean\_span\_loss - Actual\_span) + Offset \text{ If } G\_raman > G\_raman\_max, \text{ THEN } G\_raman = G\_raman\_max \quad EQ\ 2$$

For example, if the mean span loss is 23 dB and the maximum allowable Raman gain is 15 dB for an actual span loss of 20 dB, the set Raman gain is 12 dB. But if the offset is set at 2 dB, then the set Raman gain is 14 dB. This will increase the average performance at the impact of reach to some wavelengths (i.e. reduced capacity).

Figure 9A:
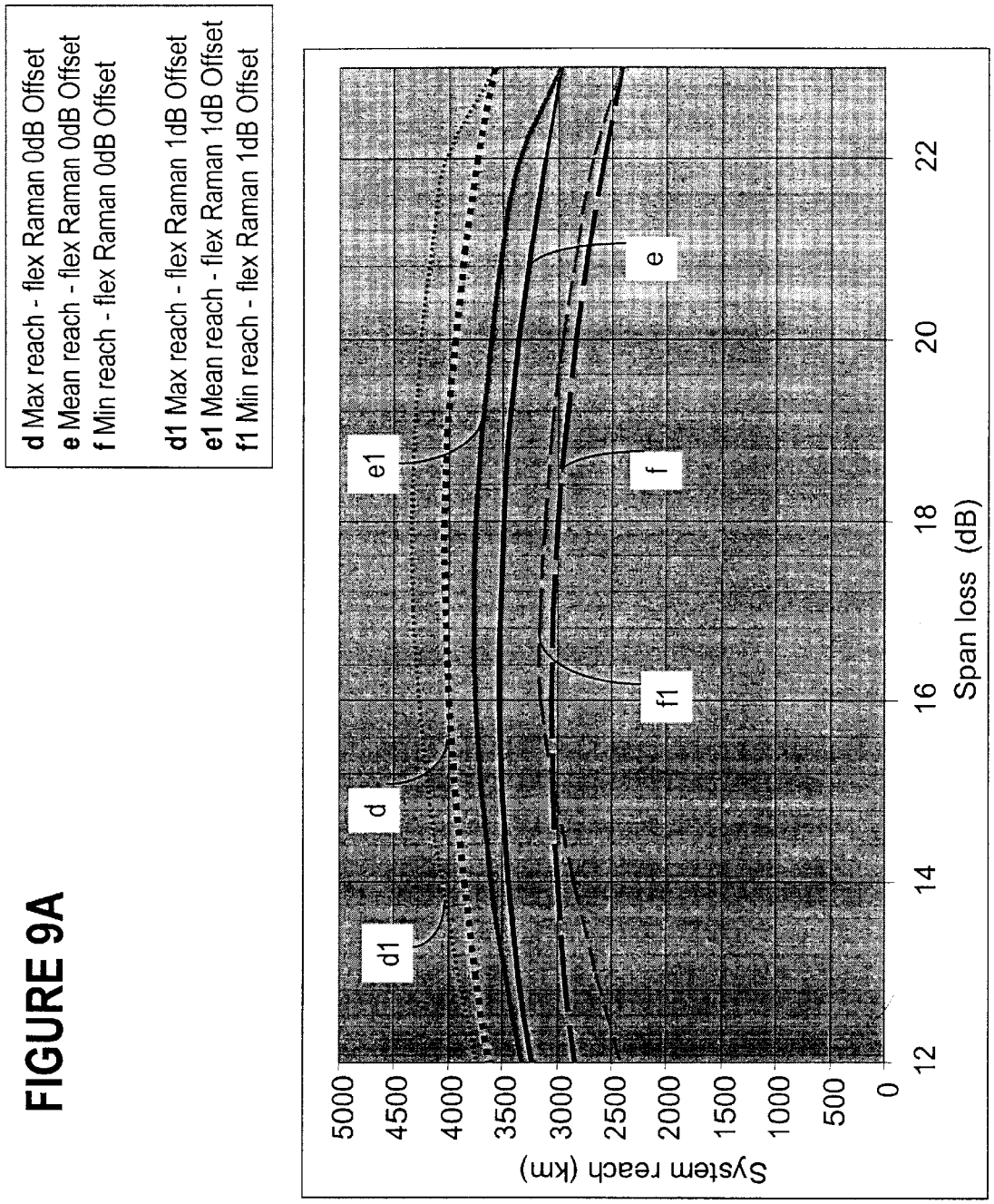
FIGS. 9A–9C illustrates the mean and extremes of the system reach distribution versus span loss, using a line amplifier with flexed Raman gain and an offset, where the offset in FIG. 9A is 1 db, in FIG. 9B is 2 dB and in FIG. 9C is 3 dB.
Figure 9B:
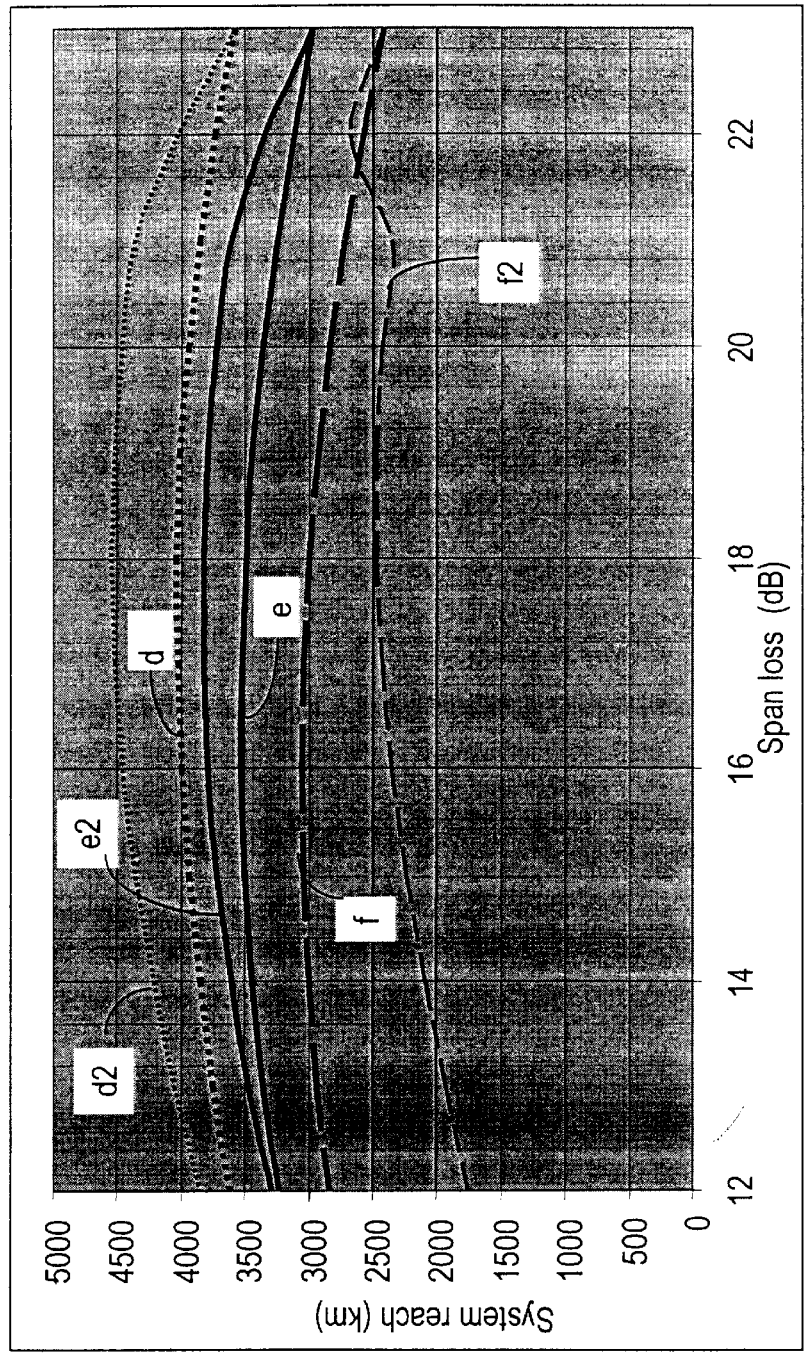
Figure 9C:
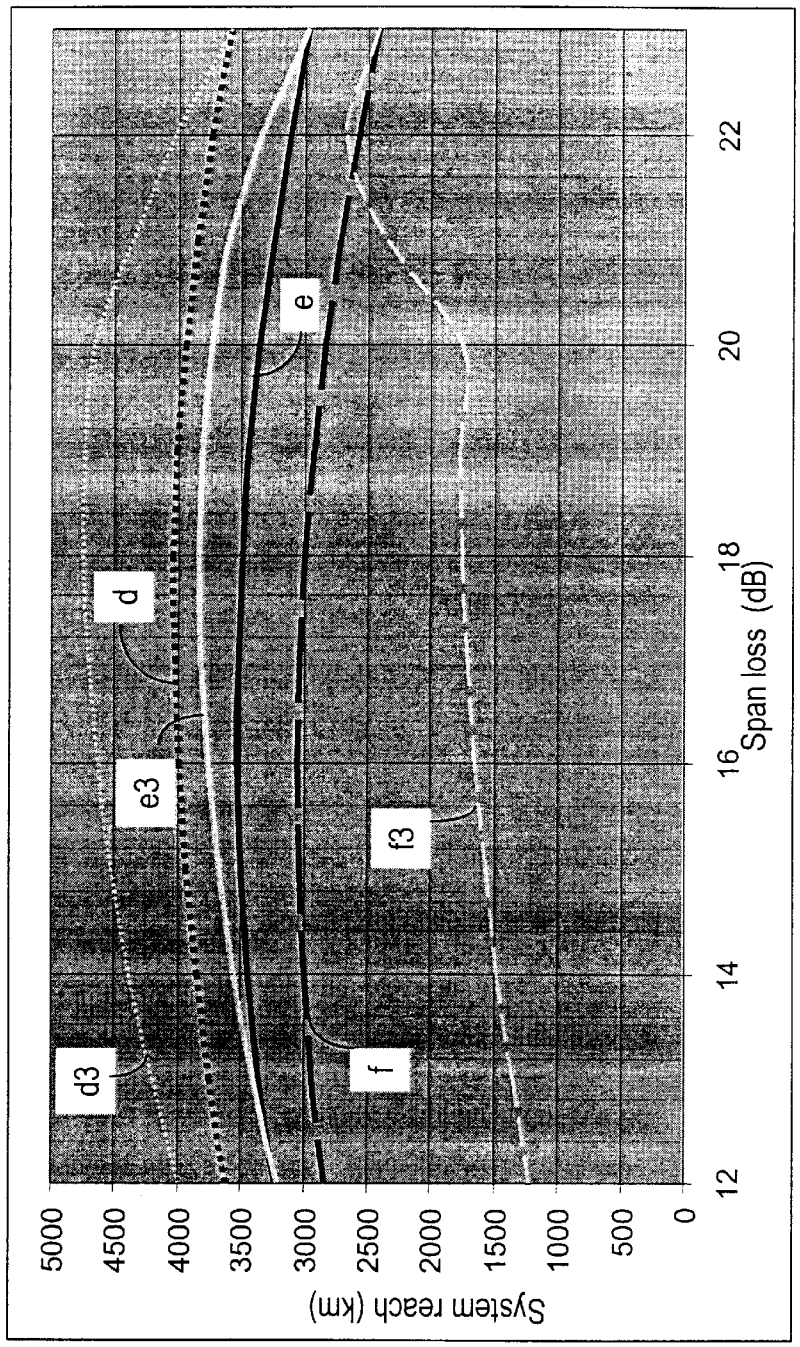

FIGS. 9A–9C show performance changes for offset values of 1 to 3 dB. Thus, the invention provides the line control system with a flexible control of the Raman assisted amplified line systems, where by means of the control system alone the reach versus capacity can be optimized for a particular implementation and requirement. This minimizes inventory and increases the number of accessible networks with a single system design.

3) In-building loss compensation

Figure 10:
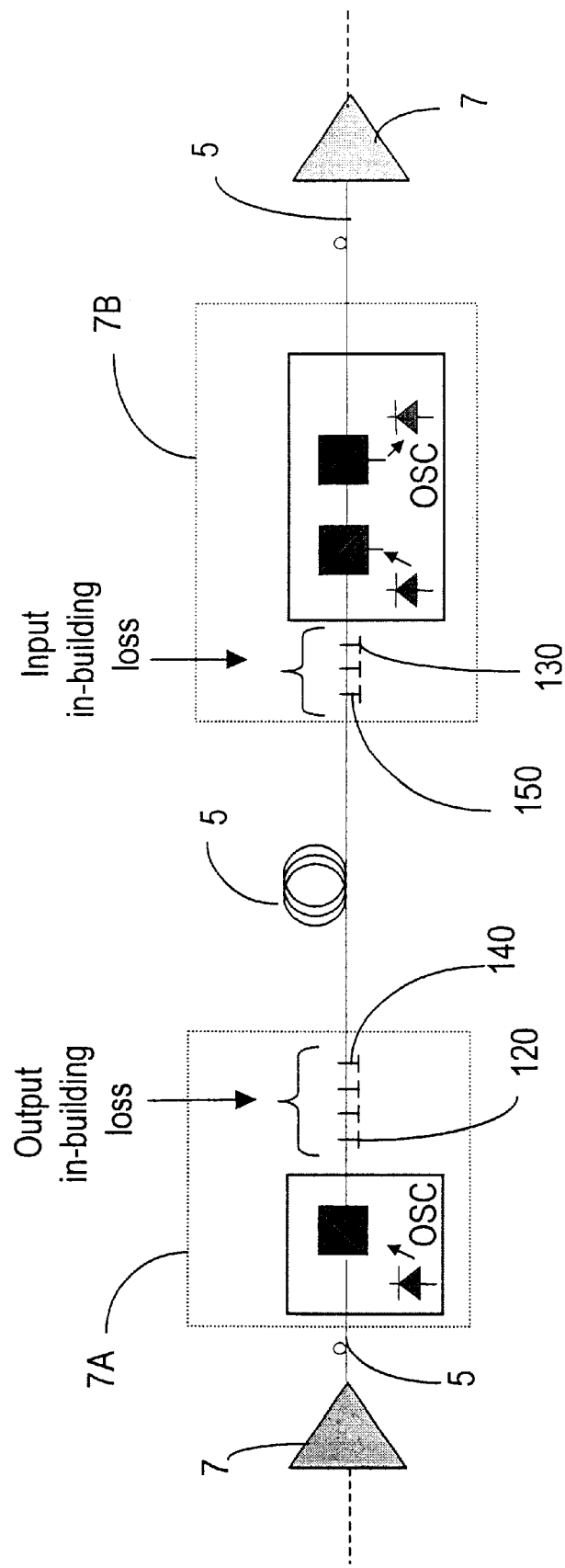
FIG. 10 shows compensation for the in-building loss.
Figure 6B:
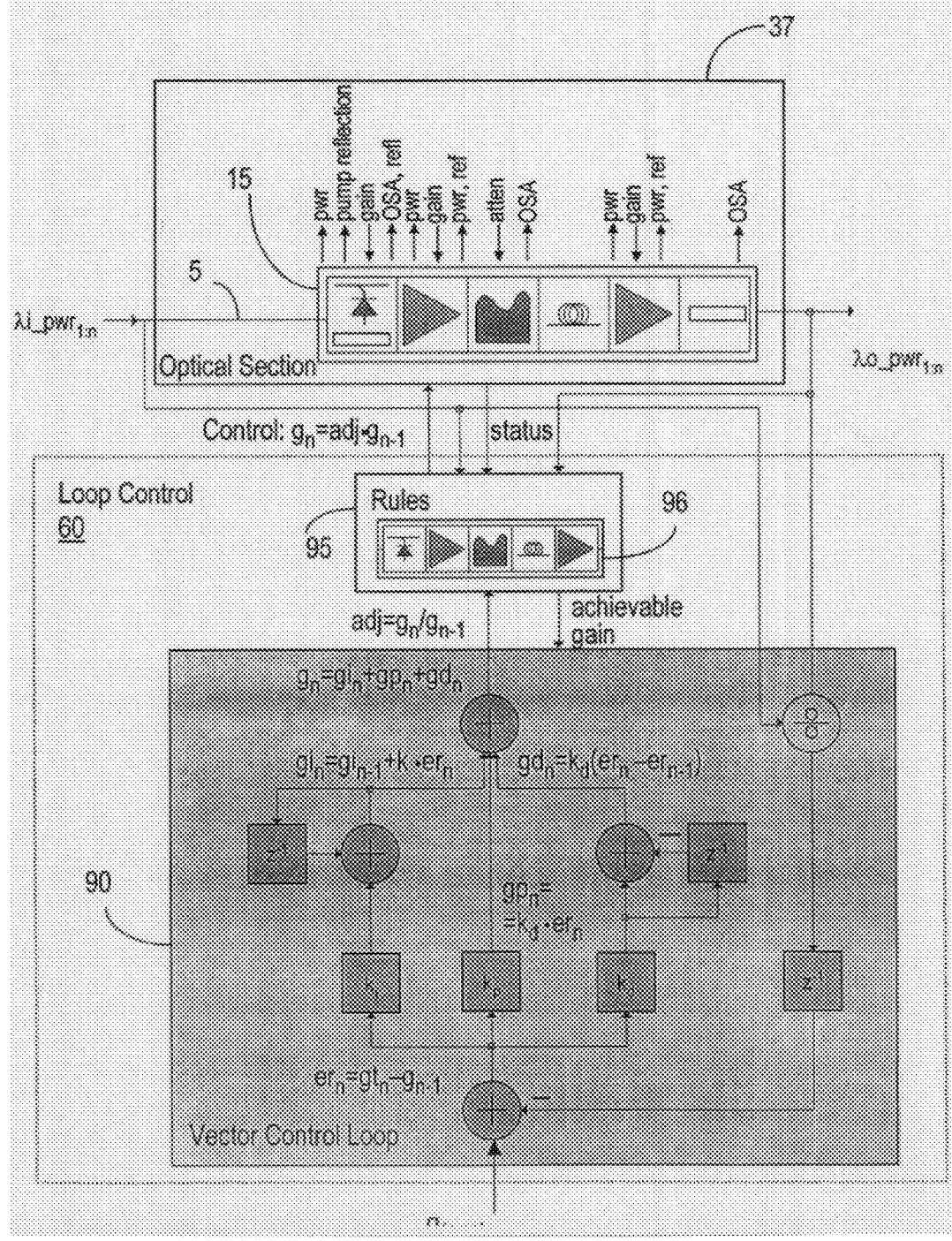

FIG. 10 shows the relevant functions in two successive line amplifiers 7A and 7B, the fiber 5 connecting the amplifiers, the output connector 120 at the output of Raman unit at site 7A, and the input connector 130 at the input of Raman unit at site 7-B. Reference numerals 140, 150 illustrate in-building connectors that conduct the fiber from the amplifier to the connector box at the curb (output building loss) and from the curb to the amplifier (input in-building loss). The number of connectors 140 and 150 depends on a number of factors not relevant to this invention (e.g. the building architecture).

These in-building losses do not add non-linear distortion to the signal, if the line amplifier 7 is over-powered to account for this loss. Thus, the performance of the line amplification system can be further improved to maintain the best possible OSNR, if the launch power target of the amplifier is increased to compensate for this loss (headroom permitting).

This optimization is achieved by imparting a default value of this loss (e.g. 0 dB) to all line amplifiers, network-wide, and accounting for it in the line control system. The default value is adjusted whenever needed/desired in two ways, i.e. as a gross network optimization and as a detailed network optimization. The gross network optimization is set via software intervention to be the same for all amplifiers. The detailed optimization can be set for each individual amplifier by adjusting the power at each amplifier site from the values at the installation time (SLAT value). The overall performance of the line amplification system is optimized in this way, while providing flexibility to the network provider to use any of, or both the gross and detailed optimization.

The in-building losses can be easily characterized during SLAT (system line-up and test) using the reflection monitors built into the Raman unit 10 and EDFA unit 20. If the last connector 140 is pulled at the output to the line and a reference reflection is applied, then the effective reflection to the line amplifier 7 can be measured using EQ3:

$$In\_building\_loss = (Ref\_reflect - Meas\_reflect)/2 \quad EQ3$$

The effective reflection is then used to enhance the performance of the amplifier in at least the following ways:

At the Raman unit 10, this measurement provides the earliest opportunity to identify unacceptable losses in the path, which may degrade the Raman performance.

At the mid-stage amplifier side, this measurement may be used to generate an over-provisioned output power that can allow to minimize the impact of the in-building losses.

The measurement identifies unacceptable losses prior to service.

4) Optimization of isolation between bands C and L.

This optimization is intended to allow sufficient deadband for a C-L coupler to provide adequate isolation between the C-band and L-band and still have a much as 80 channels in each band.

To this end, the Raman gain is increased at a level above the conventional operating point, and a red gain tilt is forced in the EDFAs. This implies reducing the gain in the blue end of the L-band spectrum which encroaches into the C-band. In addition, the gain in the blue end of the L-band may be further reduced by actively setting the loss of the gain flattening module 23 to specifically attenuate these unwanted "blue" channels.

5) Output power compression

In general, the output power capability of each line amplifier 7 has some distribution above the specified maximum. In order to obtain the maximum possible performance for the line amplification system, the line control system of network 1 allows use of the output powers that exceed the specified maximum (if available), without causing amplifier alarms or instability of the respective span loop.

To this end, the amplifier control allows delivering the maximum possible when asked for additional output power, without generating alarms, even if the asked for power is not achievable. This is possible since the amplifier control recognizes when the additional power has been delivered on request, or is due to a faulty operation.

As well, the span control loops recognize the difference between amplifier power railing and amplifier failure. In response to a request for additional output power, the span loop can either modify the control targets so that the amplifier will meet the requested output power, or can compensate for the power shortage by increasing the gain target of the next amplifier control loop.

6) Minimizing nonlinearities and maximizing OSNR on shorter spans.

The line amplifier 7 is optimized for a given span loss. Let's say for example that the amplifiers 7 are optimized for a span loss of ~23 dB. When the span loss is reduced, for example in shorter spans, the control loops lower the Raman gain to minimize amplifier tilt. This improves the OSNR on the worst channels, but may degrade the OSNR on the best channels.

To address this problem, the line control system lowers output power of the amplifier at the input of the lower loss span while maintaining the Raman gain of the amplifier at the output of the lower loss span at the conventional operating point level. The objective is to keep the net gain constant, but lower the noise contribution from the downstream amplifier. This also lowers the path averaged power and hence reduces the nonlinear effects, further improving the system Q. The lower output power reduces the probability of the EDFA from running out of power, and improves its reliability.

A hybrid solution can also be used: since the raman gain process is not noise free, the optimum operation of the link is achieved by a combination of lowering the previous EDFA output power and reducing the downstream raman gain to maintain a net gain across the span of zero.

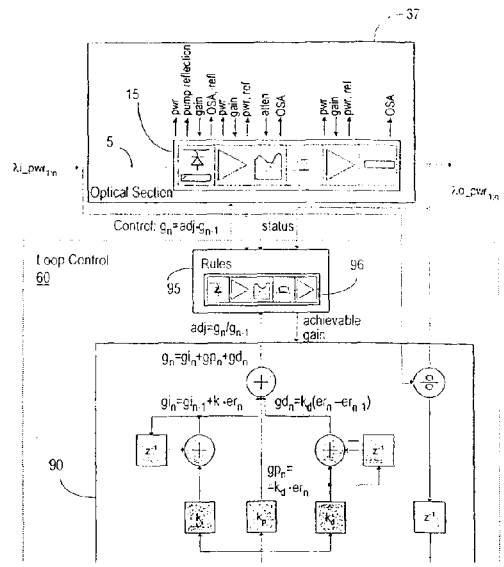

We claim:

1. A control loop for transmitting a WDM signal along a span of a wavelength switched optical network comprising:

means for measuring at preset intervals, a set of performance data regarding said WDM signal;

a vector gain loop for receiving a set of current performance data and a gain target, and providing a gain adjustment signal comprising a gain adjustment component for each channel of said WDM signal;

a control rules block for processing said gain adjustment components according to said set of current performance data, a set of previous performance data and section status data, and providing a control signal, wherein said control signal adjusts the operational parameters of an optical component of said optical section to provide corresponding output power for each channel of said WDM signal.

2. A control loop as claimed in claim 1 wherein said control rules block comprises a model of said optical section and wherein said model is continuously updated according to said set of current performance data and status data.

3. A control loop as claimed in claim 1, wherein said optical section encompasses a fiber span characterized by a fiber loss, a Raman module characterized by a Raman gain, and an EDFA module characterized by an EDFA gain.

4. A control loop as claimed in claim 3, wherein said control rules block provides for lowering said Raman gain whenever said fiber loss decreases, to maintain a net gain.

5. A control loop as claimed in claim 3, wherein said control rules block provides for maintaining said Raman gain and decreasing the power input to said optical section to maintain a net gain, whenever said optical section has a low loss.

6. A control loop as claimed in claim 3, wherein said control rules block provides for decreasing said Raman gain and decreasing the power input to said optical section to maintain a net gain, whenever said optical section has a low loss.

7. A control loop as claimed in claim 1, wherein said control rules block provides a gain target for an upstream optical amplifier whenever said set of current performance data is not available at said upstream optical amplifier.

8. A control loop as claimed in claim 1, wherein said control rules block provides for in-building loss compensation.

9. A control loop as claimed in claim 8, wherein said in-building loss compensation is performed first as a bulk network wide optimization and next as a detailed, site-specific optimization.

* * * * *

UNITED STATES PATENT AND TRADEMARK OFFICE
CERTIFICATE OF CORRECTION

PATENT NO. : 6,621,621 B1
DATED : September 16, 2003
INVENTOR(S) : Jones et al.

It is certified that error appears in the above-identified patent and that said Letters Patent is hereby corrected as shown below:

<u>Title page</u>
Illustrating Figure 6B, should be replaced with new Title page Illustrating Figure 6B.

<u>Drawings,</u>
Replace Figure 6B with new drawing Figure 6B.

Signed and Sealed this

Seventeenth Day of February, 2004

JON W. DUDAS
*Acting Director of the United States Patent and Trademark Office*

(12) United States Patent
Jones et al.

(10) Patent No.: US 6,621,621 B1
(45) Date of Patent: Sep. 16, 2003

(54) LINE AMPLIFICATION SYSTEM FOR WAVELENGTH SWITCHED OPTICAL NETWORKS

(75) Inventors: Kevan Peter Jones, Kanata (CA); Mark Stephen Wight, Ottawa (CA); Alan Glen Solheim, Stittsville (CA); Paul Edward Beer, Nepean (CA)

(73) Assignee: Innovance, Inc., Piscataway, NJ (US)

( * ) Notice: Subject to any disclaimer, the term of this patent is extended or adjusted under 35 U.S.C. 154(b) by 0 days.

(21) Appl. No.: 09/975,362

(22) Filed: Oct. 11, 2001

Related U.S. Application Data

(63) Continuation-in-part of application No. 09/876,391, filed on Jun. 7, 2001, and a continuation-in-part of application No. 09/930,528, filed on Aug. 15, 2001.
(60) Provisional application No. 60/306,302, filed on Jul. 18, 2001.

(51) Int. Cl.$^7$ .......................... H04B 10/12; H04J 14/02; H01S 3/30
(52) U.S. Cl. ................. 359/337.11; 359/334; 359/337.1; 359/341.41; 372/3
(58) Field of Search ............................ 359/334, 337.1, 359/337.11, 341.41; 372/3

(56) References Cited

U.S. PATENT DOCUMENTS

| | | | |
|---|---|---|---|
| 6,115,174 A | 9/2000 | Grubb et al. | |
| 6,236,487 B1 | 5/2001 | Stephens | |
| 6,282,002 B1 | 8/2001 | Grubb et al. | |
| 6,377,396 B1 | 4/2002 | Sun et al. | ............... 359/341.42 |
| 6,388,801 B1 | 5/2002 | Sugaya et al. | ............... 359/334 |
| 6,429,966 B1 | 8/2002 | Hazell et al. | ............ 359/341.41 |
| 6,441,950 B1 * | 8/2002 | Chen et al. | ................. 359/334 |
| 6,466,362 B1 * | 10/2002 | Friedrich | .................... 359/334 |
| 6,515,777 B1 * | 2/2003 | Arnold et al. | ............... 359/128 |

* cited by examiner

*Primary Examiner*—Nelson Moskowitz
(74) *Attorney, Agent, or Firm*—Hayes Soloway P.C.

(57) ABSTRACT

A line amplification system connected on the fiber between two flexibility sites of a wavelength switched network is built with a number of modules that can be arranged in a line amplifier, preamplifier and postamplifier configurations. The line and preamplifiers include a Raman module and a two-stage EDFA module provided with mid-stage access. A dynamic gain equalizer is connected in the mid-stage in the line amplification configurations. As well, dispersion compensating module may be connected in the mid-stage whenever/if needed. A line monitoring and control system operates the line amplification system so that all channels traveling along a link have substantially the same power, in the context of channels being added and removed to/from the line arbitrarily.

9 Claims, 15 Drawing Sheets